(12) United States Patent
Jankura et al.

(10) Patent No.: US 11,897,396 B2
(45) Date of Patent: *Feb. 13, 2024

(54) MOBILE DEVICE MOUNTING SYSTEM

(71) Applicant: Peak Design, San Francisco, CA (US)

(72) Inventors: Robb Jankura, San Francisco, CA (US); Matthew Thomas James, San Francisco, CA (US); Peter Dering, San Francisco, CA (US); Peter Lockett, San Francisco, CA (US); Arthur Viger, San Francisco, CA (US); Andrew Wheeler Gans, San Francisco, CA (US); Kiran Malladi, San Francisco, CA (US); Adrienne Rowell, San Francisco, CA (US); Jaimee Erickson, San Francisco, CA (US); Max A. Maloney, San Francisco, CA (US); Joseph Cunningham, San Francisco, CA (US); Dane Jones, San Francisco, CA (US); Colin Maginnis, San Francisco, CA (US); Rachel Roberts, San Francisco, CA (US)

(73) Assignee: PEAK DESIGN, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,767

(22) Filed: Nov. 7, 2022

(65) Prior Publication Data

US 2023/0054404 A1 Feb. 23, 2023

Related U.S. Application Data

(63) Continuation of application No. 17/067,612, filed on Oct. 9, 2020, now Pat. No. 11,548,451, which is a
(Continued)

(51) Int. Cl.
*B60R 11/02* (2006.01)
*F16B 2/04* (2006.01)
(Continued)

(52) U.S. Cl.
CPC ...... *B60R 11/0241* (2013.01); *B60R 11/0252* (2013.01); *B60R 16/03* (2013.01);
(Continued)

(58) Field of Classification Search
CPC .............. F16M 11/041; F16M 13/02; F16M 2200/024; H04M 1/04; B60R 11/0241; B60R 2011/007; H02J 7/004; H02J 50/10
See application file for complete search history.

(56) References Cited

U.S. PATENT DOCUMENTS

| 719,426 A | 2/1903 | Boone |
|---|---|---|
| 2,643,143 A | 6/1953 | Torgny |

(Continued)

FOREIGN PATENT DOCUMENTS

| AU | 2007237197 B2 | 11/2012 |
|---|---|---|
| AU | 2014232533 B2 | 3/2017 |

(Continued)

OTHER PUBLICATIONS

U.S. Appl. No. 17/704,712, filed Mar. 25, 2022, Robb Jankura.
(Continued)

*Primary Examiner* — Bradley Duckworth
(74) *Attorney, Agent, or Firm* — LICATA & TYRRELL P.C.; Bridget C. Sciamanna

(57) ABSTRACT

A mobile device mounting system includes a device case and a mount. The device case includes: an insert including a rectangular bore and defining a set of undercut sections about the rectangular bore; and a first set of magnetic elements arranged in a first pattern about the rectangular bore. The mount includes: a body; a polygonal boss extend-
(Continued)

ing from the body and configured to insert into the rectangular bore; a set of locking jaws arranged on the polygonal boss configured to transiently mate with the set of undercut sections to constrain the polygonal boss within the rectangular bore; and a second set of magnetic elements arranged in a second pattern about the polygonal boss and configured to transiently couple to the first set of magnetic elements to transiently retain the mount against the device case and to drive the set of locking jaws toward the set of undercut sections.

10 Claims, 49 Drawing Sheets

Related U.S. Application Data continuation-in-part of application No. 16/945,687, filed on Jul. 31, 2020, now Pat. No. 11,585,485.

(60) Provisional application No. 62/881,217, filed on Jul. 31, 2019.

(51) Int. Cl.
*B62J 11/00* (2020.01)
*H02J 7/02* (2016.01)
*H02J 7/00* (2006.01)
*H02J 50/10* (2016.01)
*H02J 50/70* (2016.01)
*F16M 13/02* (2006.01)
*B60R 16/03* (2006.01)
*F16B 1/00* (2006.01)
*B60R 11/00* (2006.01)

(52) U.S. Cl.
CPC ............... *B62J 11/00* (2013.01); *F16B 1/00* (2013.01); *F16B 2/04* (2013.01); *F16M 13/022* (2013.01); *H02J 7/0044* (2013.01); *H02J 7/02* (2013.01); *H02J 50/10* (2016.02); *H02J 50/70* (2016.02); *B60R 2011/0071* (2013.01); *B60R 2011/0078* (2013.01); *F16B 2200/83* (2023.08); *F16B 2200/93* (2023.08)

(56) References Cited

U.S. PATENT DOCUMENTS

| | | | |
|---|---|---|---|
| 2,661,649 A | 12/1953 | Skinner | |
| 3,312,138 A | 4/1967 | Cumming | |
| 3,612,462 A | 10/1971 | Mooney et al. | |
| 4,274,301 A | 6/1981 | Katayama | |
| 4,317,552 A | 3/1982 | Weidler | |
| 4,380,407 A | 4/1983 | Donan, Jr. | |
| 4,798,273 A | 1/1989 | Ward | |
| 5,109,411 A | 4/1992 | O'Connell | |
| 5,232,304 A | 8/1993 | Huang | |
| 5,323,600 A | 6/1994 | Munshi | |
| 5,423,566 A | 6/1995 | Warrington et al. | |
| 5,429,381 A | 7/1995 | Mercat et al. | |
| 5,661,942 A | 9/1997 | Palmer | |
| 5,746,407 A | 5/1998 | Nakatani | |
| 5,752,711 A | 5/1998 | Moreau | |
| 5,845,885 A | 12/1998 | Carnevali | |
| 6,135,408 A | 10/2000 | Richter | |
| 6,149,116 A | 11/2000 | Won | |
| 6,234,042 B1 | 5/2001 | An | |
| 6,234,506 B1 | 5/2001 | Li | |
| 6,244,131 B1 | 6/2001 | Liao | |
| 6,378,815 B1 | 4/2002 | Lee | |
| 6,445,498 B1 | 9/2002 | Baun et al. | |
| 6,561,400 B2 | 5/2003 | Lee | |
| 6,609,686 B2 | 8/2003 | Malizia | |
| 6,827,319 B2 | 12/2004 | Mayr | |
| 6,920,806 B2 | 7/2005 | Cutsforth | |
| D537,323 S | 2/2007 | Saez | |
| 7,273,203 B2 | 9/2007 | Carnevali | |
| 7,374,142 B2 | 5/2008 | Carnevali | |
| 7,398,952 B2 | 7/2008 | Carnevali | |
| 7,431,251 B2 | 10/2008 | Carnevali | |
| D588,903 S | 3/2009 | Carnevali | |
| 7,594,631 B1 | 9/2009 | Carnevali | |
| 7,624,955 B2 | 12/2009 | McGill | |
| D608,771 S | 1/2010 | Hsu | |
| 7,731,140 B2 | 6/2010 | Carnevali | |
| 7,891,618 B2 | 2/2011 | Carnevali | |
| 8,020,828 B2 | 9/2011 | Carnevali | |
| 8,235,340 B2 | 8/2012 | Carnevali | |
| 8,261,954 B2 | 9/2012 | Lee | |
| 8,267,418 B1 | 9/2012 | Chuang | |
| 8,317,048 B2 | 11/2012 | Hajichristou et al. | |
| 8,456,834 B2 | 6/2013 | Zhu et al. | |
| 8,553,408 B2 | 10/2013 | Supran et al. | |
| 8,602,277 B2 | 12/2013 | Lee | |
| 8,602,376 B2 | 12/2013 | Vogel et al. | |
| 8,608,502 B2 | 12/2013 | Witter et al. | |
| 8,613,379 B2 | 12/2013 | Lee | |
| 8,627,990 B2 | 1/2014 | Nakajima et al. | |
| 8,636,429 B2 | 1/2014 | Chen | |
| 8,641,714 B2 | 2/2014 | Steiner et al. | |
| 8,708,151 B2 | 4/2014 | Whitten et al. | |
| 8,708,205 B2 | 4/2014 | Wotton | |
| 8,807,496 B2 | 8/2014 | Kessler et al. | |
| 8,830,663 B2 | 9/2014 | Child et al. | |
| 8,870,146 B2 | 10/2014 | Vogel et al. | |
| D718,612 S | 12/2014 | McSweyn et al. | |
| D726,175 S | 4/2015 | Tsai et al. | |
| 9,060,416 B2 | 6/2015 | Supran et al. | |
| D739,708 S | 9/2015 | McSweyn et al. | |
| D740,830 S | 10/2015 | Chu | |
| 9,185,953 B2 | 11/2015 | Whitten et al. | |
| 9,243,739 B2 | 1/2016 | Peters | |
| D749,596 S | 2/2016 | Khodapanah et al. | |
| 9,317,076 B2 | 4/2016 | Rayner | |
| 9,437,969 B2 | 9/2016 | Witter et al. | |
| 9,498,034 B2 | 11/2016 | Whitten et al. | |
| 9,592,871 B2 | 3/2017 | Whitten et al. | |
| 9,611,881 B2 | 4/2017 | Khodapanah et al. | |
| 9,651,069 B2 | 5/2017 | Aspinall et al. | |
| 9,689,527 B2 | 6/2017 | Franklin | |
| D792,415 S | 7/2017 | Tsai | |
| 9,700,114 B2 | 7/2017 | Whitten et al. | |
| 9,704,632 B2 | 7/2017 | Baca | |
| 9,765,921 B2 | 9/2017 | Vogel et al. | |
| 9,773,601 B2 | 9/2017 | Breiwa et al. | |
| 9,800,283 B2 | 10/2017 | Schmidt | |
| D804,413 S | 12/2017 | McSweyn et al. | |
| D805,085 S | 12/2017 | Xiang et al. | |
| 9,847,805 B2 | 12/2017 | Sirichai | |
| 9,848,071 B2 | 12/2017 | Thiers | |
| 9,869,423 B2 | 1/2018 | Khodapanah et al. | |
| 9,872,544 B2 | 1/2018 | Ho | |
| D818,421 S | 5/2018 | Hu | |
| 10,036,507 B2 | 7/2018 | Vogel et al. | |
| 10,066,779 B2 | 9/2018 | Nogel et al. | |
| 10,070,707 B2 | 9/2018 | Whitten et al. | |
| 10,078,346 B2 | 9/2018 | Lay et al. | |
| 10,088,096 B2 | 10/2018 | Minn et al. | |
| 10,125,921 B2 * | 11/2018 | Khodapanah | F16M 13/00 |
| 10,134,517 B2 | 11/2018 | Baca | |
| 10,192,665 B2 | 1/2019 | Breiwa et al. | |
| 10,215,330 B2 | 2/2019 | Vogel et al. | |
| D842,306 S | 3/2019 | Lindo et al. | |
| 10,237,384 B2 | 3/2019 | Holder | |
| D845,963 S | 4/2019 | Lindo et al. | |
| D846,543 S | 4/2019 | Chen | |
| D847,823 S | 5/2019 | Monsalve et al. | |
| D852,196 S | 6/2019 | Alves | |
| D852,681 S | 7/2019 | Peters et al. | |
| D854,021 S | 7/2019 | Alves | |
| 10,505,392 B2 | 12/2019 | McSweyn et al. | |
| D873,812 S | 1/2020 | Peters et al. | |

(56) References Cited

U.S. PATENT DOCUMENTS

| | | | |
|---|---|---|---|
| 10,569,717 B2 | 2/2020 | Peters et al. | |
| 10,571,964 B2 | 2/2020 | Barnett et al. | |
| D877,741 S | 3/2020 | Leeds-Frank | |
| 10,649,492 B2 | 5/2020 | Peters et al. | |
| 10,694,012 B2 | 6/2020 | Krenn | |
| 10,760,732 B1 | 9/2020 | Koh et al. | |
| 10,899,285 B2 | 1/2021 | Aloe et al. | |
| 11,239,697 B2 | 2/2022 | Min | |
| 11,246,233 B2 | 2/2022 | Venkatesh et al. | |
| 11,548,451 B2 * | 1/2023 | Jankura | B60R 11/02 |
| 11,585,485 B2 * | 2/2023 | Jankura | B60R 11/0241 |
| 2002/0113185 A1 | 8/2002 | Ziegler | |
| 2003/0218108 A1 | 11/2003 | Werner | |
| 2005/0284991 A1 | 12/2005 | Saez | |
| 2007/0040084 A1 | 2/2007 | Sturman et al. | |
| 2008/0224000 A1 | 9/2008 | Yang | |
| 2009/0250567 A1 | 10/2009 | Raynaud | |
| 2010/0019109 A1 | 1/2010 | Liu | |
| 2011/0147546 A1 | 6/2011 | Monsalve et al. | |
| 2011/0192857 A1 * | 8/2011 | Rothbaum | F16M 11/041 248/220.21 |
| 2011/0204111 A1 | 8/2011 | Lee | |
| 2011/0260016 A1 | 10/2011 | Johnson et al. | |
| 2011/0260017 A1 | 10/2011 | Monsalve et al. | |
| 2013/0175413 A1 | 7/2013 | Waugh | |
| 2014/0354218 A1 | 12/2014 | Kaynar et al. | |
| 2014/0355200 A1 | 12/2014 | Thiers | G06F 1/1632 |
| 2015/0076296 A1 | 3/2015 | Yang | |
| 2015/0158545 A1 | 6/2015 | Lanz | |
| 2015/0286117 A1 | 10/2015 | Sung et al. | |
| 2016/0134142 A1 | 5/2016 | Murphy | |
| 2016/0150861 A1 | 6/2016 | Yao et al. | |
| 2016/0309865 A1 | 10/2016 | Chiang | |
| 2016/0347257 A1 | 12/2016 | Buchanan | |
| 2017/0370517 A1 | 12/2017 | Underwood | |
| 2018/0032104 A1 | 2/2018 | Schatz et al. | |
| 2019/0009850 A1 | 1/2019 | Peters | |
| 2019/0198212 A1 * | 6/2019 | Levy | F16M 11/2021 |
| 2019/0230205 A1 | 7/2019 | Lee | |
| 2019/0371504 A1 | 12/2019 | Breiwa et al. | |
| 2020/0366131 A1 | 11/2020 | Min | |
| 2021/0026409 A1 | 1/2021 | Miles et al. | |
| 2021/0046885 A1 | 2/2021 | Jankura et al. | |
| 2021/0367452 A1 | 11/2021 | Nahum et al. | |
| 2022/0140653 A1 | 5/2022 | Blaser et al. | |
| 2022/0214602 A1 | 7/2022 | Zhu et al. | |

FOREIGN PATENT DOCUMENTS

| | | |
|---|---|---|
| CN | 101377711 A | 3/2009 |
| CN | 201228837 | 4/2009 |
| CN | 102758993 A | 10/2012 |
| CN | 202518427 U | 11/2012 |
| CN | 103003615 B | 3/2015 |
| CN | 105122132 A | 12/2015 |
| CN | 206341268 U | 7/2017 |
| CN | 105247266 B | 1/2018 |
| CN | 107816609 A | 3/2018 |
| CN | 208191049 U | 12/2018 |
| CN | 209860980 U | 12/2019 |
| CN | 212745681 U | 3/2021 |
| CN | 213479596 U | 6/2021 |
| CN | 215111698 U | 12/2021 |
| CN | 215111699 U | 12/2021 |
| DE | 202004017041 U1 | 1/2005 |
| EP | 0736447 A1 | 10/1996 |
| EP | 2925594 B1 | 1/2017 |
| FR | 2990406 B1 | 4/2014 |
| JP | H02779 B2 | 1/1990 |
| TW | M493509 U | 1/2015 |
| WO | 03033335 A1 | 4/2003 |
| WO | 2010017668 A1 | 2/2010 |
| WO | 2014078493 A1 | 5/2014 |
| WO | 2019227141 A1 | 12/2019 |
| WO | 2020055560 A1 | 3/2020 |
| WO | 2022047882 A1 | 3/2022 |
| WO | 2022047883 A1 | 3/2022 |

OTHER PUBLICATIONS

U.S. Appl. No. 17/827,870, filed May 30, 2022, Robb Jankura.

European Search Report Received in EP Application No. 20188805.4 dated Aug. 12, 2020; 11 pages.

Office Action received in Chinese Patent Application No. 202010759718.4 dated Jun. 16, 2021.

Office Action received in ROC (Taiwan) Patent Application No. 109126037 dated Mar. 12, 2021 (English translation).

Office Action Received in ROC (Taiwan) Patent Application No. 110120758 with Search Report dated Sep. 30, 2021.

International Search Report and Written Opinion for International Patent Application No. PCT/US2022/031483 dated Sep. 19, 2022; 10 pages.

Office Communication dated May 25, 2022 in U.S. Appl. No. 16/945,687, filed Jul. 31, 2020.

Office Communication dated Sep. 22, 2022 in U.S. Appl. No. 16/945,687, filed Jul. 31, 2020.

Office Communication dated Oct. 19, 2022 in U.S. Appl. No. 16/945,687, filed Jul. 31, 2020.

Office Communication dated May 25, 2022 in U.S. Appl. No. 17/067,612, filed Oct. 9, 2020.

Office Communication dated Sep. 22, 2022 in U.S. Appl. No. 17/067,612, filed Oct. 9, 2020.

Office Communication dated Oct. 25, 2022 in U.S. Appl. No. 17/067,612, filed Oct. 9, 2020.

Office Communication dated May 25, 2022 in U.S. Appl. No. 17/704,712, filed Mar. 25, 2022.

Office Communication dated Feb. 1, 2023 in U.S. Appl. No. 17/704,712, filed Mar. 25, 2022.

\* cited by examiner

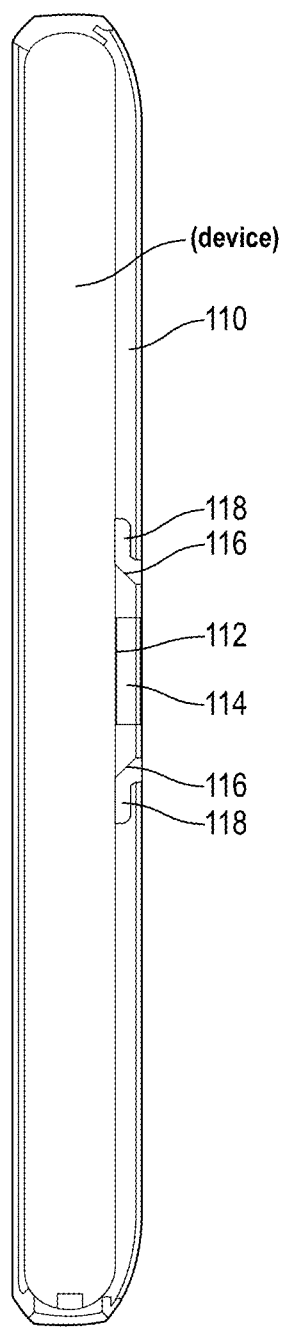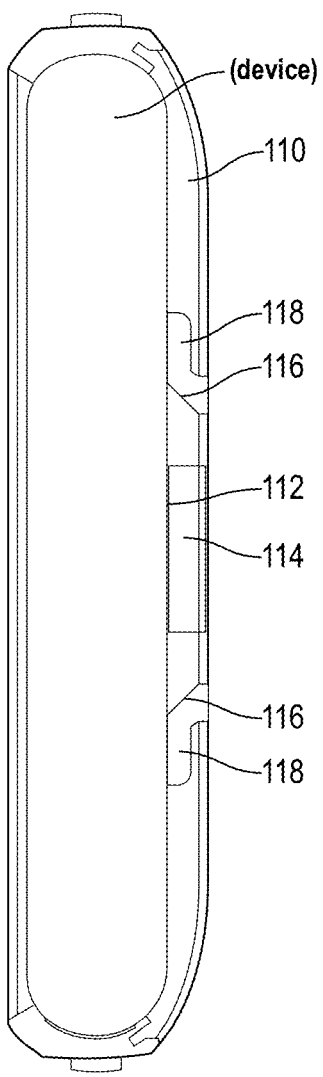
FIG. 4A
FIG. 4B

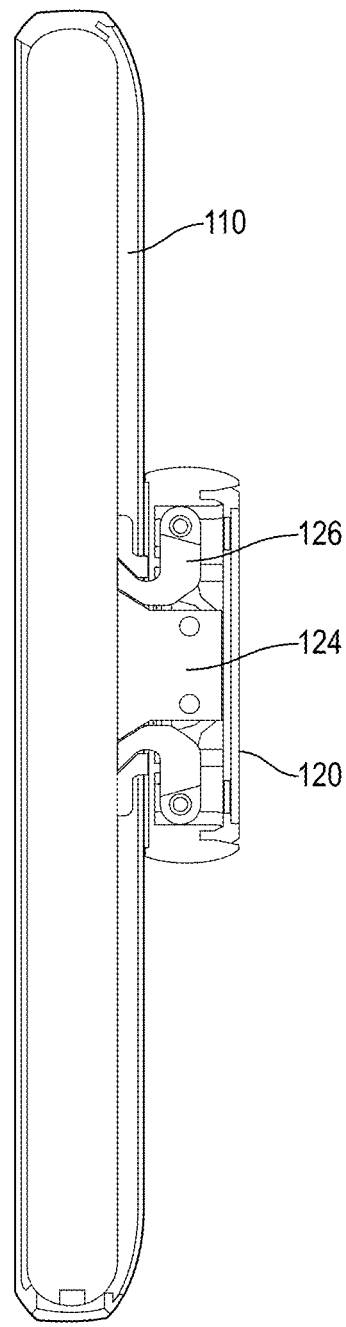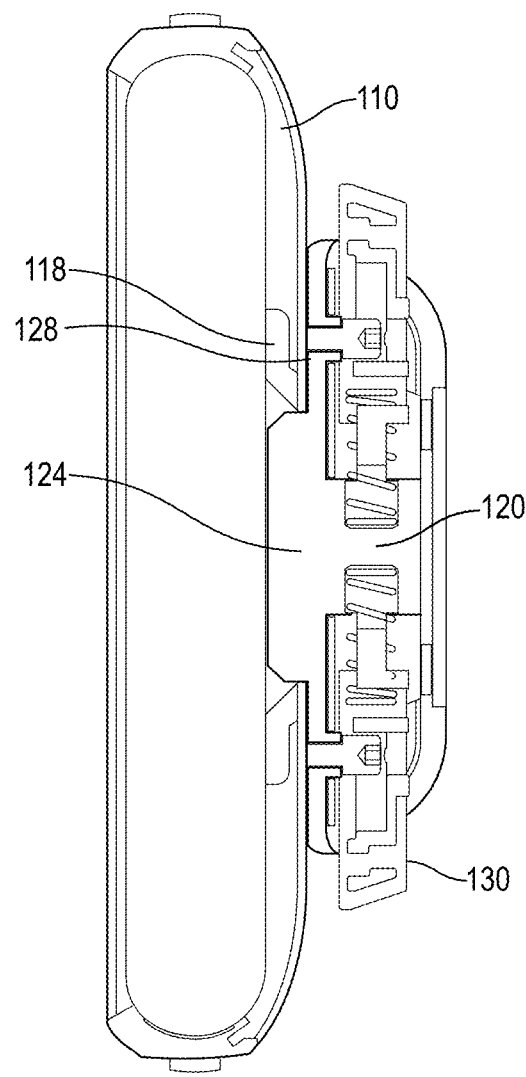
FIG. 5A
FIG. 5B

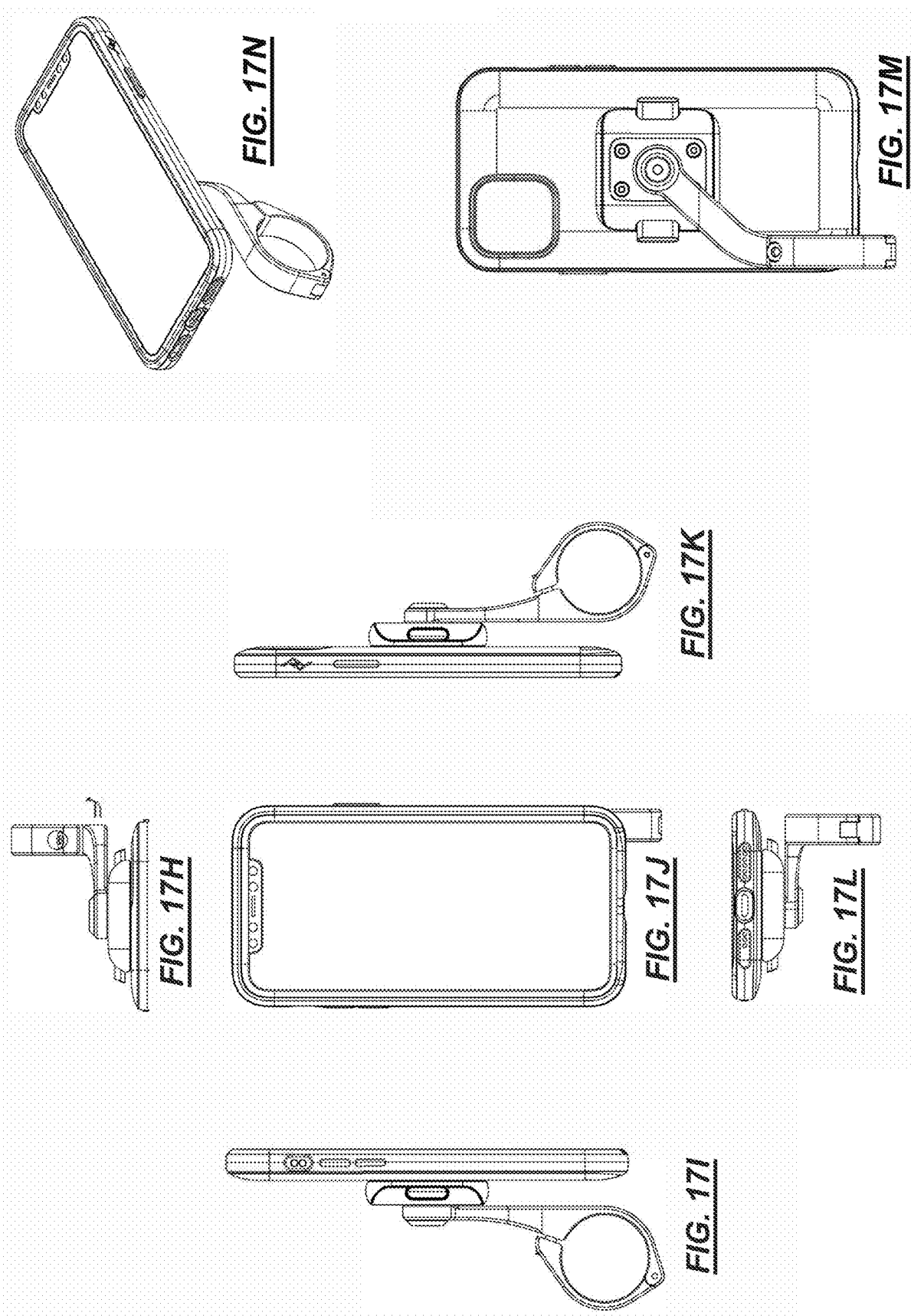

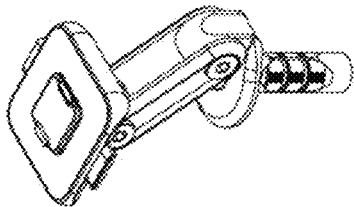
FIG. 19A
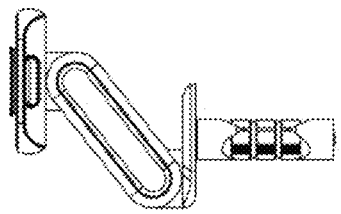
FIG. 19G
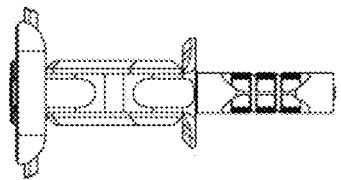
FIG. 19F
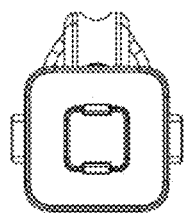
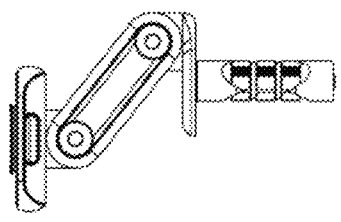
FIG. 19C
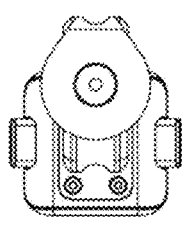
FIG. 19E
FIG. 19D
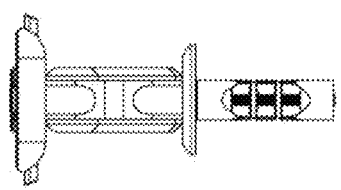
FIG. 19B

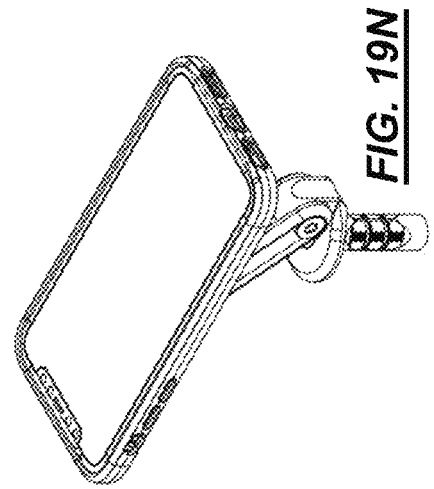
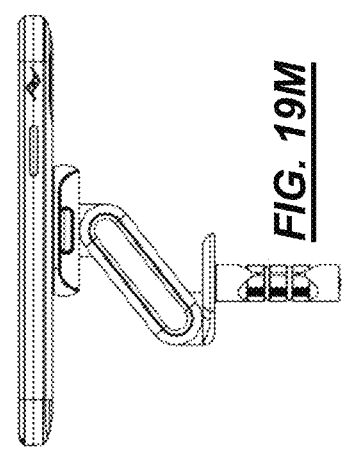
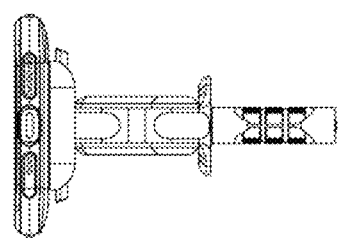
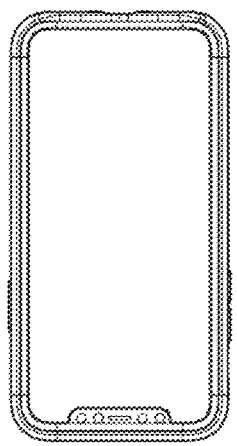
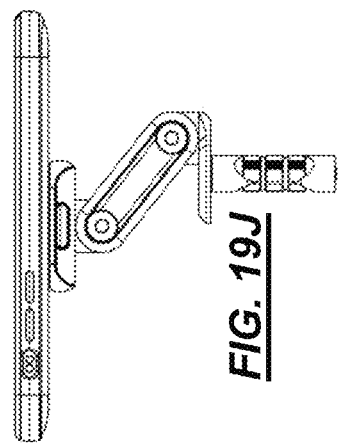
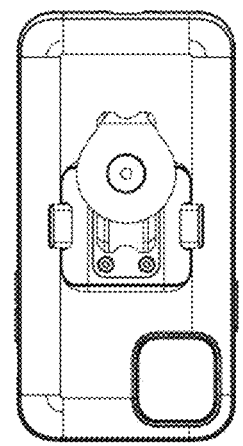
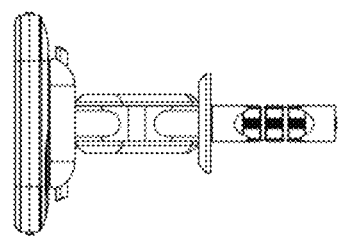

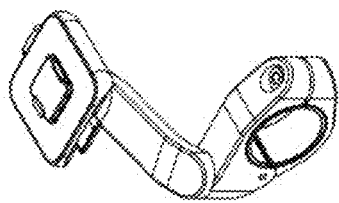
FIG. 23A
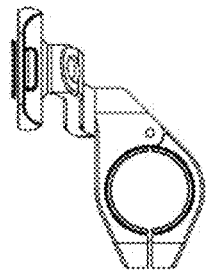
FIG. 23G
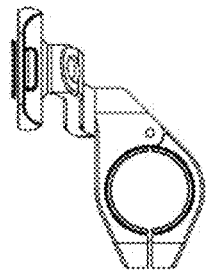
FIG. 23F
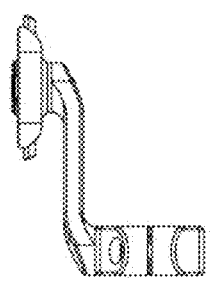
FIG. 23D
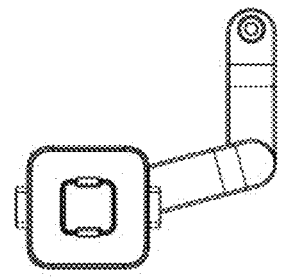
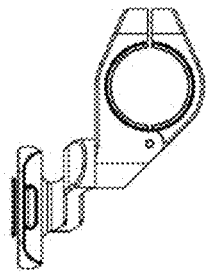
FIG. 23C
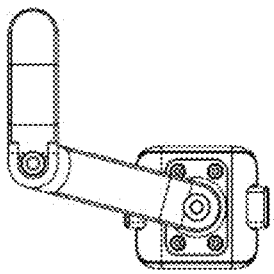
FIG. 23E
FIG. 23B

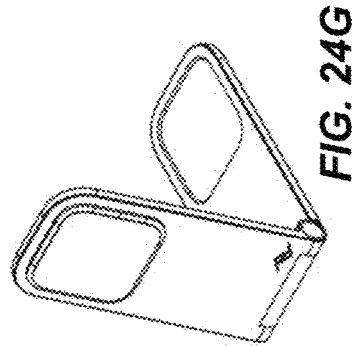
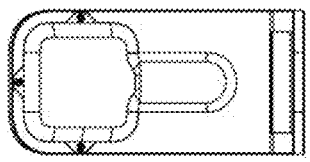
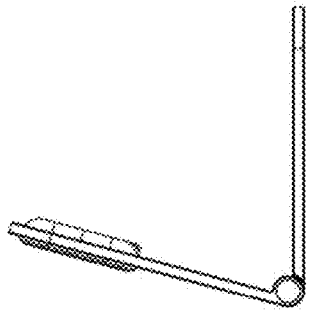
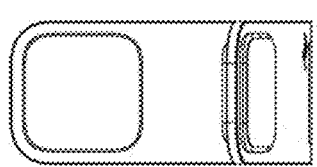
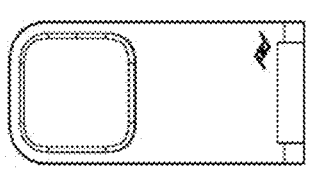
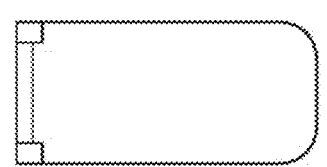
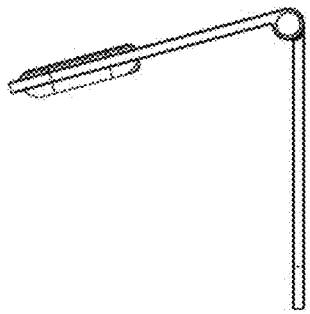

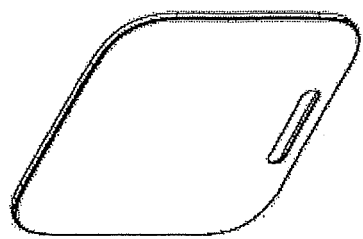
FIG. 27B
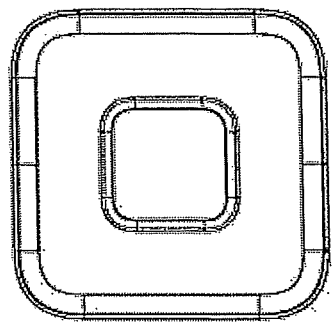
FIG. 27H
FIG. 27F
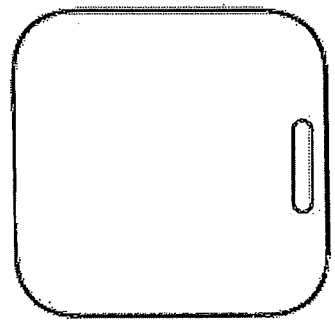
FIG. 27C  FIG. 27G  FIG. 27E
FIG. 27D
FIG. 27A

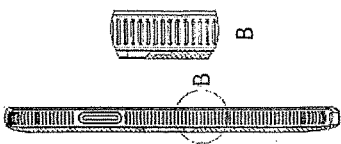
FIG. 29J
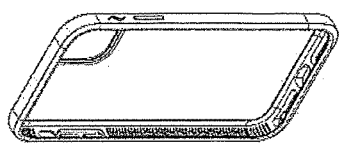
FIG. 29B
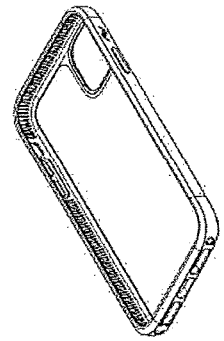
FIG. 29D
FIG. 29H
FIG. 29E
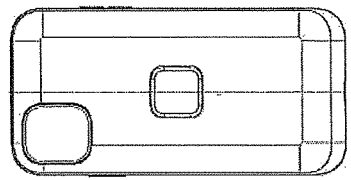
FIG. 29G
FIG. 29I
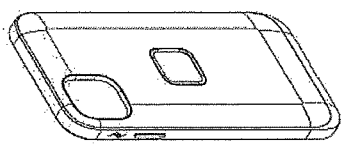
FIG. 29F
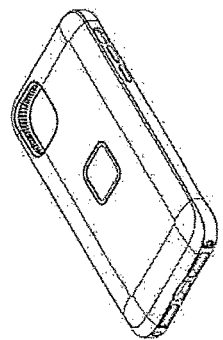
FIG. 29A
FIG. 29C

MOBILE DEVICE MOUNTING SYSTEM

CROSS-REFERENCE TO RELATED APPLICATIONS

This application is a continuation application of U.S. patent application Ser. No. 17/067,612, filed on 9 Oct. 2020, which is a continuation-in-part of U.S. patent application Ser. No. 16/945,687, filed on 31 Jul. 2020, which claims the benefit of U.S. Provisional Application No. 62/881,217, filed on 31 Jul. 2019, each of which is incorporated in its entirety by this reference.

TECHNICAL FIELD

This invention relates generally to the field of mobile device accessories and more specifically to a new and useful mounting system in the field of mobile device accessories.

BRIEF DESCRIPTION OF THE FIGURES

FIGS. 4A and 4B are schematic representations of the mounting system;
FIGS. 5A and 5B are schematic representations of the mounting system;
FIGS. 27A-H are schematic representations of an adapter;
FIGS. 29A-J are schematic representations of a device case.

DESCRIPTION OF THE EMBODIMENTS

Figure 1:
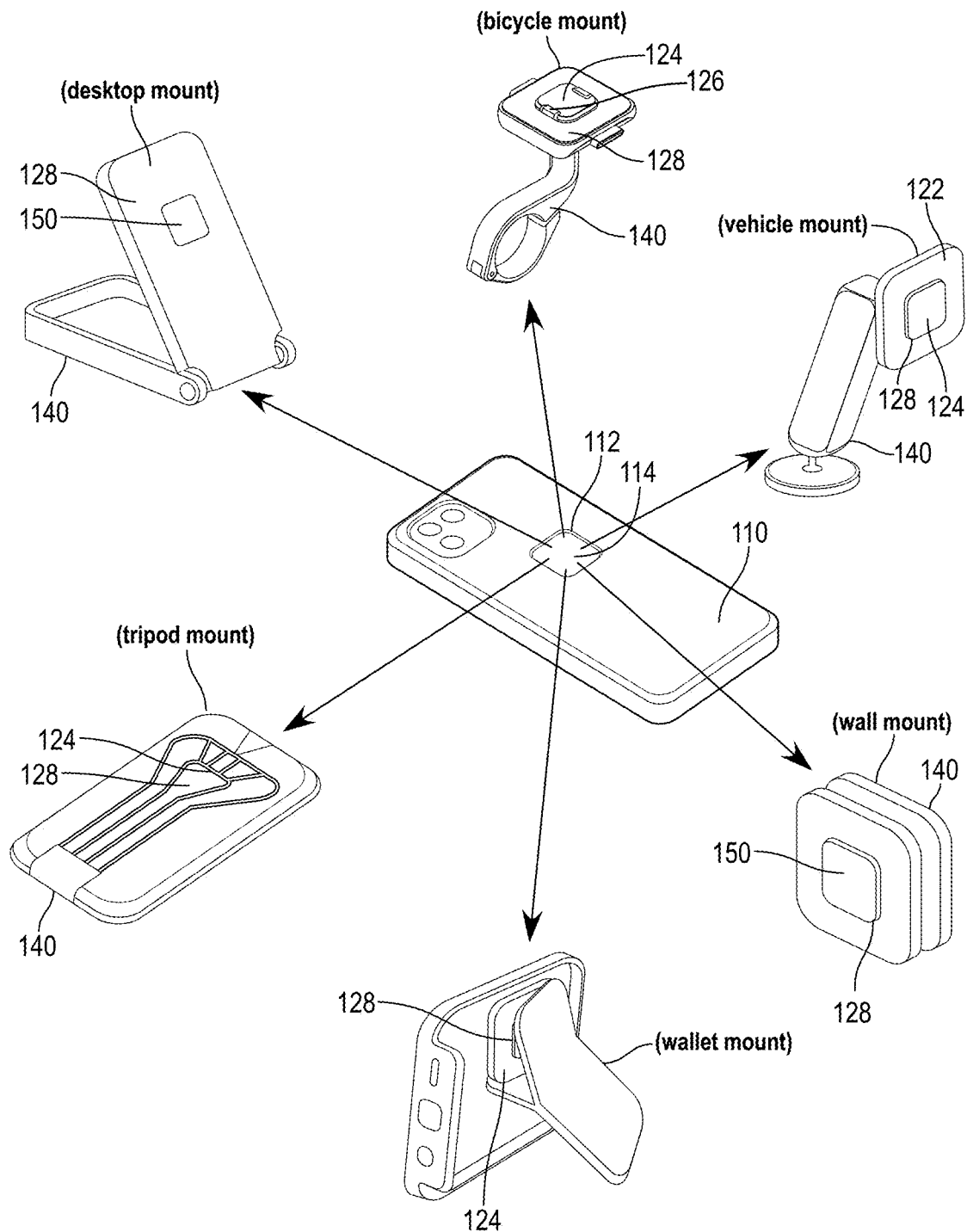
FIG. 1 is a schematic representation of a mounting system.
Figure 2:
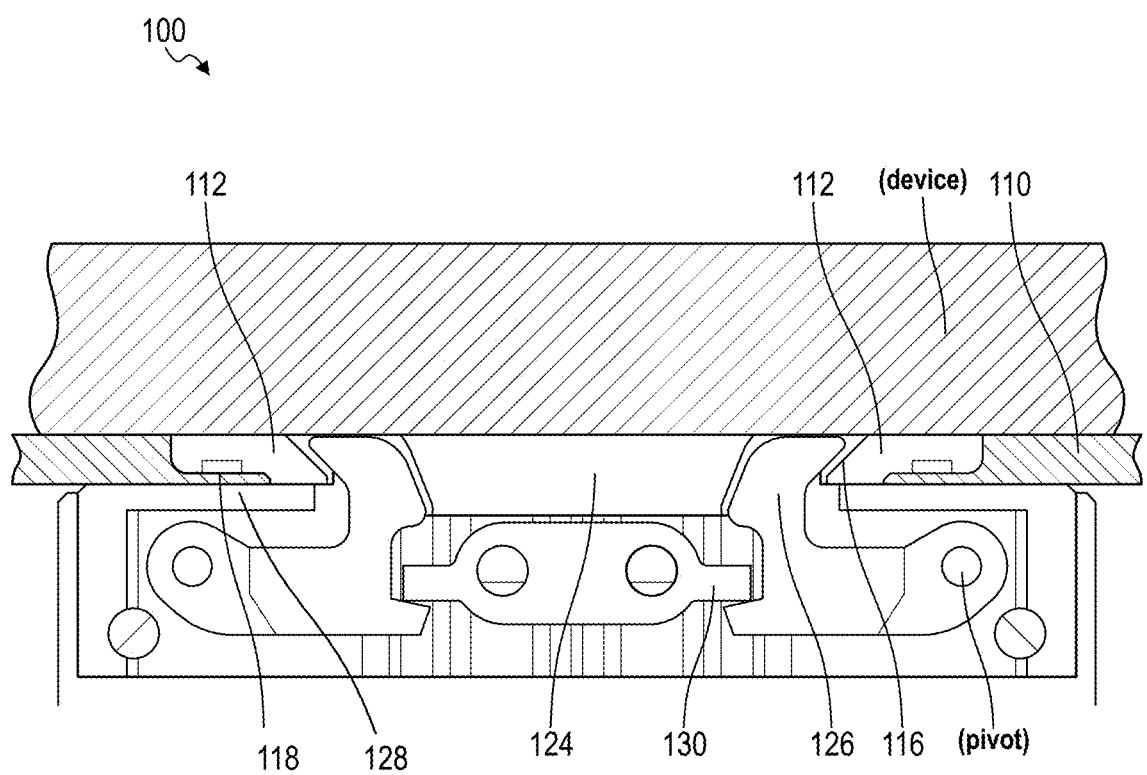
FIG. 2 is a schematic representation of the mounting system.
Figure 3A:
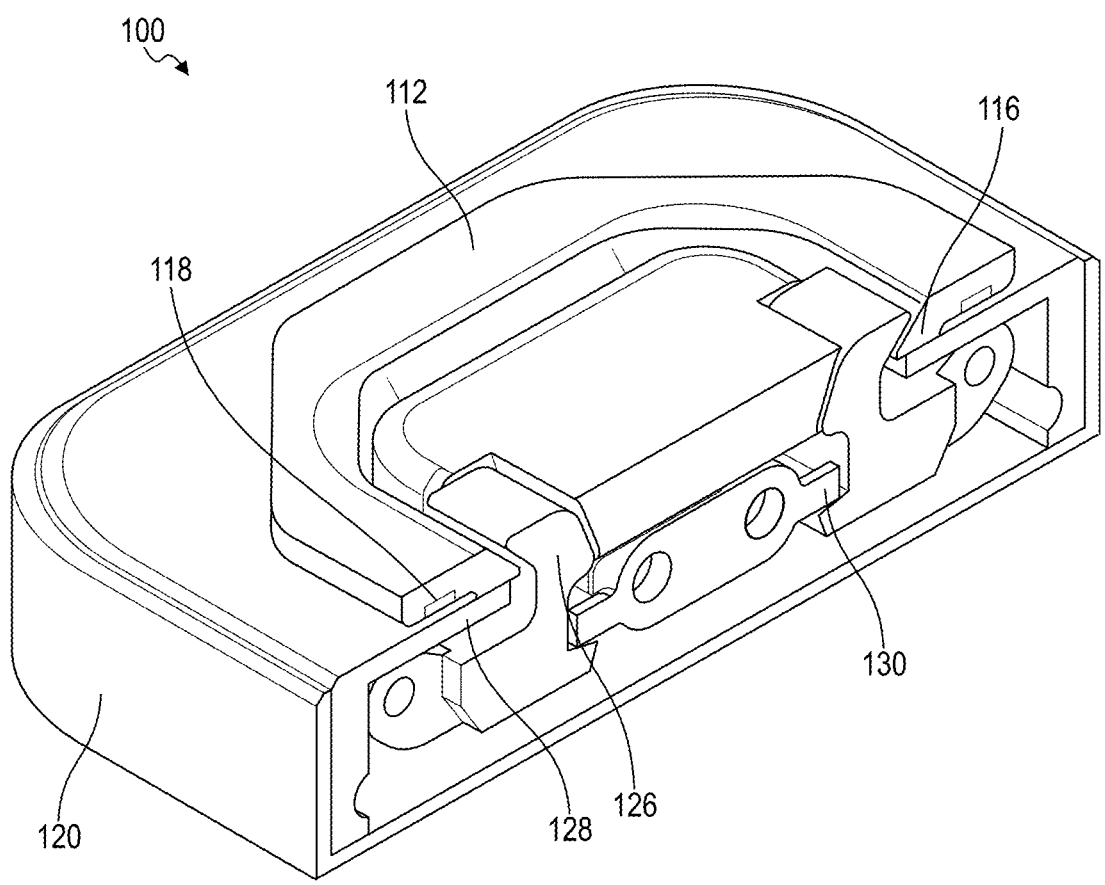
FIGS. 3A and 3B are schematic representations of the mounting system.
Figure 3B:
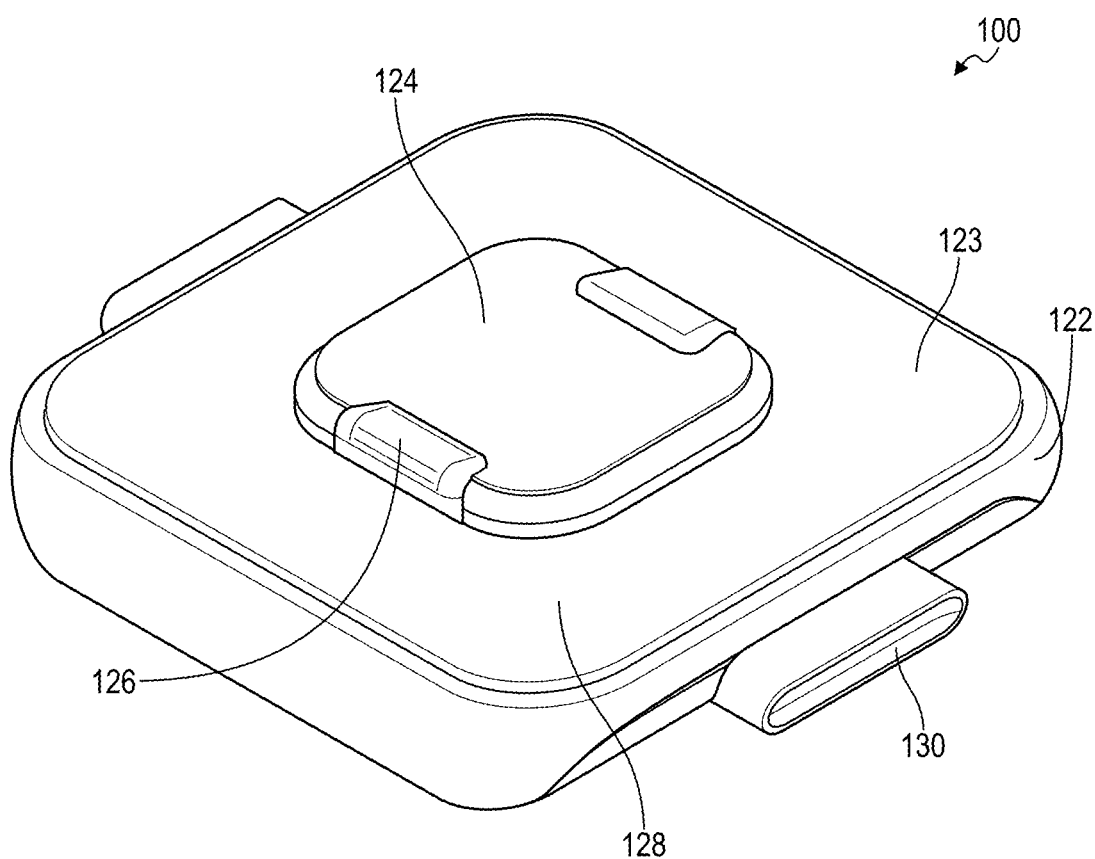
Figure 6A:
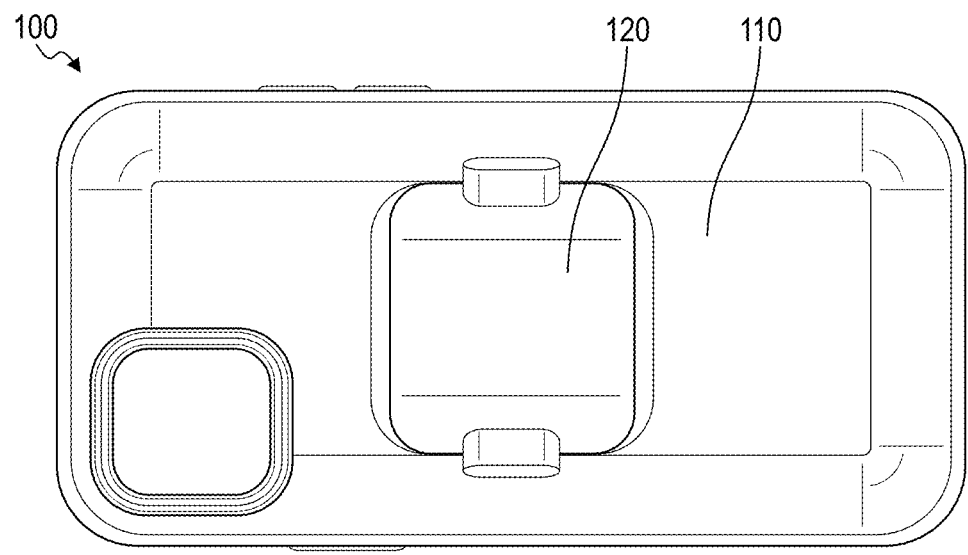
FIGS. 6A and 6B are schematic representations of the mounting system.
Figure 6B:
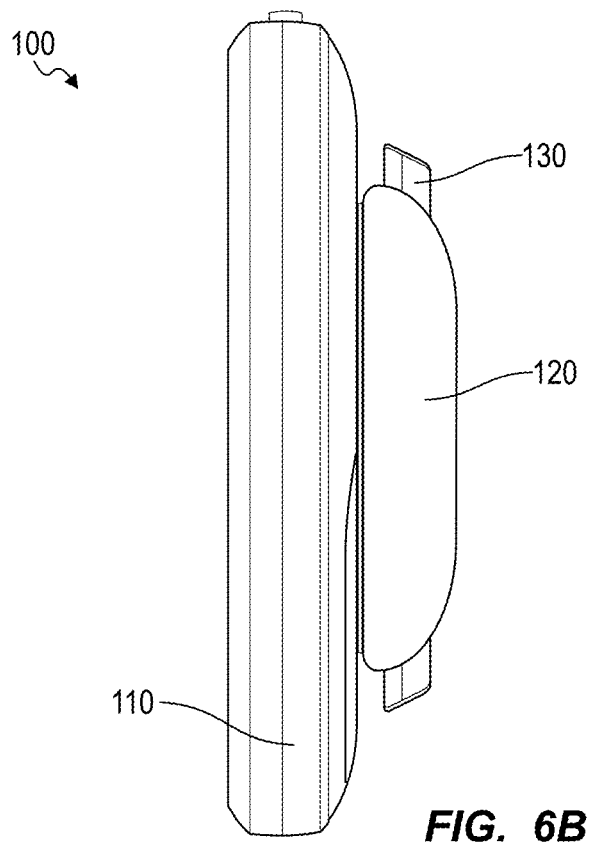

The following description of the embodiments of the invention is not intended to limit the invention to these embodiments but rather to enable a person skilled in the art to make and use this invention.

1. Mounting System

As shown in FIGS. 1-6B, a mounting system 100 includes a device case 110 and a mount 120. The device case no includes: an insert 112 including a rectangular bore 114 and defining a set of undercut sections 116 about the rectangular bore 114; and a first set of magnetic elements 118 arranged in a first pattern about the rectangular bore 114. The mount 120 includes: a body 122; a polygonal boss 124 extending from the inner face 123 of the body 122 and configured to insert into the rectangular bore 114 of the device case no; a set of locking jaws 126 arranged on the polygonal boss 124 configured to transiently mate with the set of undercut sections 116 to constrain the polygonal boss 124 within the rectangular bore 114; a second set of magnetic elements 128 arranged in a second pattern about the polygonal boss 124 and configured to transiently couple to the first set of magnetic elements 118 of the device case 110 to align the polygonal boss 124 with the rectangular bore 114 of the insert 112 of the device case 110, to transiently retain the mount 120 against a rear face of the device case 110, and to draw the set of locking jaws 126 toward the set of undercut sections 116 of the insert 112; and a locking control 130 configured to trigger a subset of locking jaws 126 (e.g., one of two locking jaws 126 or both of two locking jaws 126), in the set of locking jaws 126, to decouple from a subset of undercut sections 116, in the set of undercut sections 116 responsive to compression.

In one variation, as shown in FIGS. 1-7, the mounting system 100 includes a device case no and a mount 120. The device case no includes: an insert 112 comprising a rectangular bore 114; and a first set of magnetic elements 118 arranged in a first pattern about the rectangular bore 114. The mount 120 includes: a body 122; a polygonal boss 124 extending from an inner face 123 of the body 122, configured to insert into the rectangular bore 114, and configured to constrain the mount 120 in rotation about the device case no; a second set of magnetic elements 128 arranged in a second pattern about the polygonal boss 124 and configured to transiently couple to the first set of magnetic elements 118 of the device case no to align the polygonal boss 124 with the rectangular bore 114 of the insert 112 of the device case no and to transiently retain the mount 120 against a rear face of the device case 110. In this variation, the mount 120 further includes a charging element 150: housed within the body 122; inset from the second set of magnetic elements 128; and configured to inductively charge a device installed within the device case 110.

In one variation, as shown in FIGS. 1-6B, the mounting system 100 includes: a device case 110; a first mount 120; and a second mount 120. The device case 110 includes: an insert 112 comprising a rectangular bore 114; and a first set of magnetic elements 118 arranged in a first pattern about the rectangular bore 114. The first mount 120 includes: a first body 122; a first polygonal boss 124 extending from a first inner face 123 of the first body 122 and configured to insert into the rectangular bore 114; a second set of magnetic elements 128 arranged in a second pattern about the first polygonal boss 124 and configured to transiently couple to the first set of magnetic elements 118 of the device case no to retain the first polygonal boss 124 with the insert 112 of the device case no; and a first backing coupled to the first body 122 opposite the first polygonal boss 124 configured to affix the first mount 120 to a first surface. The second mount 120 includes: a second body 122; second polygonal boss 124 extending from a second inner face 123 of the second body 122 and configured to insert into the rectangular bore 114; a third set of magnetic elements arranged in a third pattern about the second polygonal boss 124 and configured to transiently couple to the first set of magnetic elements 118 of the device case no to retain the second polygonal boss 124 with the insert 112 of the device case no; and a second backing couple to the second body 122 opposite the second polygonal boss 124 configured to affix the second mount 120 to a wallet.

2. Applications

Generally, the mounting system 100 includes a device case no and a mount 120 configured to transiently engage and retain the device case no. The device case no includes: an insert 112 defining a set of undercut sections 116 arranged about a rectangular bore 114 and configured to receive a set of locking jaws 126 from the mount 120; a first set of magnetic elements 118 arranged about the rectangular bore 114 and positioned to guide the device case no into a locking arrangement with a mount 120; all of which cooperate with features of the mount 120 to enable a user to quickly locate and passively lock (e.g., without manually screwing, tightening, etc.) the device case 110 onto the mount 120 with a single hand and in a single motion. More specifically, the mount 120 includes: a second set of magnetic elements 128 configured to transiently magnetically couple to the first set of magnetic elements 118 of the device case 110; and a set of sprung mechanical jaws 126 configured to cooperate with the set of undercut sections 116 to constrain rotation of the device case 110 relative the mount 120 in order to— complementary to the magnetic locking force between the first set of magnetic elements 118 and the second set of magnetic elements 128—mechanically secure the device case 110 to the mount 120 without necessitating manual tightening or locking by the user.

For example, the insert 112 can be formed of a rigid, substantially non-conductive material (e.g., a non-magnetic ceramic) to define a thin structure (e.g., three millimeters or less) that is (or can be) integrated into a backing plate of a mobile device case 110. The insert 112 also includes: a rectangular bore 114 that defines a set of undercut sections 116 about the rectangular bore 114; and a first set of magnetic elements 118 (e.g., neodymium magnets, ceramic magnets, ferrite magnets, electromagnets, ferrous elements, correlated magnets) arranged about the rectangular bore 114 in a first pattern with rotational symmetry of order "four." The mount 120 can include a second set of magnetic elements 128 in a similar pattern and configured to magnetically couple to the first set of magnetic elements 118 in the device case 110 in order to draw the device case 110 toward the mount 120 while orienting the device case 110 relative to the mount 120 in one of four orientations (e.g., portrait, landscape, portrait-inverted, landscape-inverted). The mount 120 also includes a set of locking jaws 126 inset from the magnetic elements, configured to engage the undercut sections 116 of the device case 110, and sprung in order to apply a lateral force against the undercut sections 116 and thus mechanically retain the device case 110 against the mount 120. Furthermore, the first set of magnetic elements 118 of the insert 112 and the second set of magnetic elements 128 of the mount 120 are sized to yield a magnetic force that: orients the insert 112 relative to the mount 120 to align undercut sections 116 of the insert 112 to the set of locking jaws 126 of the mount 120; engages the undercut sections 116 of the insert 112 against inclined surfaces on the set of locking jaws 126; and draws the insert 112 toward the mount 120 to drive the inclined surfaces on the set of locking jaws 126 along the undercut sections 116, thereby overcoming a spring force on the set of locking jaws 126 and displacing the set of locking jaws 126 around and behind the undercut sections 116. A spring element inside the mount 120 then drives set of locking jaws 126 outwardly behind the undercut sections 116 to engage and mechanically retain the insert 112—and thus the device case 110.

Therefore, the mounting system 100 can enable a user to locate the device case 110 near the mount 120, orient the device case 110 relative to the mount 120, and mechanically (i.e., robustly) latch the device case 110 to the mount 120 with a single hand and in a single motion.

Furthermore, in one variation, the mount 120 can include an ejector configured to simultaneously release the set of locking jaws 126 from adjacent undercut sections 116 and to lift or pivot a portion of the insert 112 off of the mount 120, thereby: separating a first set of magnetic elements 118 in the insert 112 from adjacent magnetic elements in the mount 120; reducing magnetic coupling (or a "magnetic holding force") between the insert 112 and the mount 120; and enabling manual retrieval of the device case 110 from the mount 120. For example, the ejector can include a lever or pushbutton extending laterally from the mount 120 such that the ejector is immediately accessible to a user's forefinger when the user grasps a mobile device coupled to the device case 110, thereby enabling the user to access the ejector, trigger the ejector to disengage the mount 120 from the device case 110, and remove the mobile device and device case no from the mount 120 in a single motion, with a single hand, and without looking directly at the mounting system 100.

The device case no can interface with a suite of mounts 120 assembled in various configurations and configured to affix to various object or surface types, such as: a vehicle air vent; a vehicle dashboard; a bicycle frame; bicycle or motorcycle handlebars; a stroller; a golf cart; a wall; a desk; a table; an armband; a belt; a waistband; a wallet; or a tripod. Therefore, a user may: install a suite of such mounts 120 in common mobile device locations; install her smartphone (or tablet or other mobile device) in the mounts 120; and thus seamlessly transition her smartphone between these mounts 120 in these common mobile device locations.

3. Example Applications

In one example, a user may: acquire an instance of the device case no; install her smartphone in the device case no;

acquire a set of mounts 120—such as in multiple configurations and/or with the same or different emplacement mechanisms 140; and install or locate these instances of the mount 120 in various home, office, vehicle, and personal spaces (e.g., in her personal vehicle, over a food preparation area in her kitchen, on handlebars of her bicycle, on her office desk, on her nightstand, on her messenger bag, with her workout gear). During various activities or actions (e.g., driving, cooking, cycling, working, sleeping, traveling, exercising), the user may place the device case no on a nearby or corresponding mount 120 in order to reliably and robustly locate her mobile device in the user's preferred mobile device orientation (e.g., portrait, landscape) for this activity or action.

In this example, the user may—upon leaving work at the end of the day—bring the device case 110 near the mount 120 affixed to the strap of her messenger bag strap until the first set of magnetic elements 118: engages with the magnetic elements of the mount 120 to automatically align the undercut sections 116 of her device case 110 to the set of locking jaws 126 of her bag-strap mount 120 (e.g., in a portrait orientation in line with the bag strap); and drives the locking jaws of the mount 120 into the rectangular bore 114 of the device case 110 to fully lock the mobile phone in place. Upon feeling the locking jaws automatically click shut—securing the mobile phone to the mount 120—the user may let go of the mobile phone and walk confidently to a nearby networking event where she can then reach with one hand to remove the phone from the bag-strap mount 120 by feeling behind the device case 110 to engage the ejector with one finger while simultaneously pulling the device case 110 off of the bag-strap mount 120. The user may then orient her phone to landscape mode; write her name in a drawing app; and snap her phone back into her bag-strap mount 120—the phone in landscape mode—to use her mobile phone as a name-tag during the event.

Later, the user may walk to her bicycle; remove her mobile phone from her bag-strap mount 120; and place her mobile phone onto her bicycle's handlebar mount 120, where the device case 110 can automatically align to the magnetic elements of the bicycle mount 120 and automatically lock into place with the locking jaws of the bicycle mount 120. Upon arriving home, the user may: remove the mobile phone from the bicycle mount 120 with one hand; walk into her apartment; bring up a recipe for her dinner on her mobile phone; and place her mobile phone onto her wall mount 120 in her kitchen. The user may then remove the mobile phone from her wall mount 120 and place her larger tablet mobile device—also equipped with tablet case including an insert 112 and a first set of magnetic elements 118—onto the same wall mount 120 such that the first set of magnetic elements 118 of the tablet case engage with the magnetic elements of the wall mount 120 to automatically align the tablet into a landscape orientation and automatically lock that tablet in place with the set of locking jaws 126. The user may then watch a video playing on the larger tablet mobile device locked into the wall mount 120 and—when the video is finished—engage an ejector extension integrated into the tablet case to mechanically actuate the ejector of the wall mount 120 to remove the tablet mobile device with a single motion and a single hand.

The user may then: place the mobile phone on her vehicle mount 120 as she drives to the store; remove the mobile phone from her vehicle mount 120; attach her mobile phone to her armband mount 120 as she shops; remove her mobile phone from her armband to wave her mobile phone at a touchless payment kiosk to enable a financial transaction via her mobile phone; and replace the mobile phone onto her armband mount 120 all while using only one hand.

4. Device Case

The mounting system 100 includes a device case 110 configured to accept and retain a mobile device (e.g., a smartphone, a tablet, a smartwatch). Generally, as shown in FIGS. 4A, 4B, and 29A-J, the device case 110 includes: an insert 112 integrated into the device case 110 and defining a rectangular bore 114; and a first set of magnetic elements 118 arranged about the rectangular bore 114 configured to transiently couple to a second set of magnetic elements 128 of a mount 120. The device case 110 can be configured to accept and retain the mobile device within a cavity on an interior face of the device case 110 and retain a boss of the mount 120 within the rectangular bore 114 on an exterior face of the device case no, such that a user may couple her mobile device, within the device case no, to the mount 120 in order to affix her mobile device to a particular surface and continue viewing and/or interacting with a display of the mobile device.

In one implementation, the device case no includes a polymer housing configured to accept and retain the mobile device and a non-polymer insert 112 configured to transiently couple with a mount 120. The device case no can be machined such that the non-polymer insert 112 is securely attached to the polymer housing, such that the insert 112 can support both the polymer housing and a mobile device retained within the polymer housing when coupled to a mount 120. For example, the device case no can be machined via bonding the non-polymer insert 112 to the polymer housing. In another example, the device case no can be machined via press-fitting the insert 112 into the polymer housing.

4.1 Insert

As shown in FIGS. 4A and 4B, the device case no includes an insert 112 configured to couple the device case no with the mount 120. The insert 112 includes a rectangular bore 114 configured to accept the polygonal boss 124 of the mount 120 and defines a set of undercut sections 116 about the rectangular bore 114. Generally, the insert 112 can be formed of a rigid non-magnetic material, such as machined titanium, sintered ceramic, or tungsten carbide. In one implementation, the insert 112 includes a rigid plate formed of a substantially non-magnetic (e.g., non-conductive) material (e.g., a non-magnetic ceramic, aluminum, alumina, titanium, carbon fiber, fiberglass, polymers, reinforced polymers, composites, etc.). The insert 112 can include this rigid plate in order to enable coupling of the insert 112 to the mount 120 while supporting both the device case 110 and a mobile device retained within the device case 110. In one implementation, the device case 110 includes: a polymer housing configured to accept and retain the mobile device; and an insert 112 including a ceramic structure (e.g., a ceramic rigid plate). Further, by including an insert 112 of a non-magnetic material, the first set of magnetic elements 118 of the device case no can couple to the second set of magnetic elements 128 of the mount 120 without interference by the insert 112, thus enabling the insert 112 to properly align with the mount 120 (e.g., the polygonal boss 124 of the mount 120).

The insert 112 defines an outer surface—configured to mate with the mount 120—that is substantially flush with a back surface of the device case no. For example, the device case no can define a thickness of a back surface of the device case no, the back surface defining an inner wall configured to couple with a mobile device and an outer wall opposite the inner wall. The insert 112 can be configured such that the outer surface of the insert 112 falls within a threshold distance of the inner wall of the back surface of the device case no corresponding to the thickness of the back surface. In this example, the user may remove her mobile phone—housed within the device case no—from her pocket in a single swift motion without the device case no and/or insert 112 snagging on fabric in her pocket. In one variation, the insert 112 defines a thickness approximating a thickness of the back surface of the device case no (e.g., less than three millimeters, less than five millimeters, etc.). In this variation, the device case no can exhibit a consistent thickness across the back surface—including across an area corresponding to the insert 112—while the insert 112 is sufficiently strong to couple to the mount 120 and support a mobile device housed within the device case no.

4.1.1 Undercut Sections of the Insert

The insert 112 also defines a rectangular bore 114 (or recess, cavity, etc.) that forms a set of undercut sections 116. Each undercut section defines an undercut bevel that forms an angle offset from the insert 112 (e.g., 30 degrees, 45 degrees, 60 degrees). Generally, the set of undercut sections 116 can be configured to engage locking jaws of the mount 120 in order to mechanically retain the insert 112—and therefore the device case no contained therein—to the mount 120.

In one implementation, the rectangular bore 114 exhibits rotational symmetry of order four (i.e., is symmetric about a horizontal axis, a vertical axis, and orthogonal diagonal axes) such that rectangular bore 114s of the insert 112 can set over locking jaws of the mount 120 in four discrete, 90-degree-offset orientations, such as including portrait, landscape, portrait-inverted, and landscape-inverted orientations. For example, the rectangular bore 114 can define a square opening with filleted (i.e., internally-radiused) corners to form a "superellipse" or "squircle."

In another implementation, the rectangular bore 114 can exhibit a rectangular, hexagonal, circular, or other geometry—such as with stops or locating features—characterized by a limited number of rotation orders of symmetry that enable the rectangular bore 114 to be set around the locking jaws of the mount 120 in a small number of discrete orientations, such as landscape and portrait orientations parallel to primary axes of a display of a mobile device installed in the device case 110.

4.2 Magnetic Elements of the Device Case

The device case 110 can include a first set of magnetic elements 118 (e.g., a set of four magnetic elements or Halbach arrays) arranged in a pattern—relative to the rectangular bore 114 of the insert 112. Furthermore, the pattern of first set of magnetic elements 118 in the device case 110 can be substantially identical to a pattern of a second set of magnetic elements 128 (e.g., passive magnetics/ferrous elements, active magnetics/first set of magnetic elements 118, etc.) within the mount 120 such that the first set of magnetic elements 118 in the device case 110 magnetically couple to the second set of magnetic elements 128 in the mount 120 in each of the orientations supported by the rectangular bore 114 of the insert 112 and a polygonal boss 124 of the mount 120.

Generally, the first set of magnetic elements 118 can apply a magnetic force to the set of magnetic elements on the mount 120 to automatically align the device case 110 to a nearest orientation relative to the mount 120 when the device case 110 is brought near the mount 120. For example, the first set of magnetic elements 118 can apply a magnetic force to the magnetic elements of the mount 120 to align the set of undercut sections 116 of the rectangular bore 114 of the device case 110 to the set of locking jaws 126 of the mount 120 to drive the set of locking jaws 126 into the rectangular bore 114, thereby enabling the locking jaws to mechanically engage the undercut sections 116 and thus retain the device case 110 against the mount 120.

In one implementation shown in FIGS. 1, 3A, 4A, and 4B, the insert 112 defines a square external section with chamfered corners and is molded, bonded, or mechanically fastened to an opening in the back side of the device case 110. In this implementation, a first set of magnetic elements 118 are molded or bonded into the back side of the device case 110 proximal and offset from each chamfered corner of the insert 112 such that the insert 112 minimally interferes with (e.g., minimally shields) a magnetic field of these first set of magnetic elements 118. Alternatively, the insert 112 can be formed of a non-conductive material (e.g., non-magnetic)—such as a cast, machined, or sintered ceramic—and first set of magnetic elements 118 can be potted or bonded into bores across the insert 112 (or across an inner face of the insert 112). In another alternative, the first set of magnetic elements 118 can be overmolded in the case (e.g., coplanar with the case).

In one implementation, the first set of magnetic elements 118 can include a single magnetic element embedded within one side of the insert 112. The single magnetic element can engage with a single magnetic element positioned on a first side of a mount 120, the first side including an operable locking jaw. The single magnetic element can define a substantially rectangular profile and extend the length of the first side of the mount 120 to magnetically couple with a similarly sized magnetic element in the first side, such that the single magnetic element can apply a magnetic force along the entirety of the first side of the mount 120 to fix the device case 110 to the mount 120. In another implementation, the single magnetic element can engage with each of a set of magnetic elements of the mount 120, such that the device case 110 can affix to the mount 120 in multiple orientations. By including a single magnetic element instead of multiple magnetic elements, a manufacturer can produce the device case 110 with fewer parts (e.g., fewer magnets), fewer production costs (e.g., material costs for the magnets, assembly stations), and fewer steps (e.g., placing additional magnets, orienting each additional magnet according to polarity).

In another implementation, the first set of magnetic elements 118 can include two magnetic elements 118 embedded within the insert 112. The two magnetic elements 118 can be arranged within undercut sections 116 on opposite sides of the insert 112 (or on adjacent sides of the insert 112) to engage with two magnetic elements 128 in a complementary arrangement on the mount 120. The two magnetic elements 118 can further define a set of device case no orientations with respect to the mount 120 by defining a second magnetic anchor point for each orientation. In yet another implementation, the first set of magnetic elements 118 can include four magnets embedded at each corner of an insert 112 forming a rounded square to apply a magnetic force at each corner of the insert 112 to reduce jostling and vibration of the device case 110.

In one example, the first set of magnetic elements 118 can include a set of linear Halbach arrays (e.g., wherein each magnet in each linear Halbach array exhibits a polarity distinct from any adjacent magnet in the array to nearly cancel the magnetic field on a first side and to amplify the magnetic field on a side opposite the first side) arranged around the inner bore. The amplified magnetic field can increase magnetic coupling of the first set of magnetic elements 118 with the magnetic elements in the mount 120 while reducing magnetic interference with the mobile phone.

In one variation, the device case no (or the mount 120) includes a set of electromagnets in place of the first set of magnetic elements 118 (or in place of the set of magnetic elements) described above. In this variation, the device case no (or the mount 120) can selectively activate the set of electromagnets responsive to detected proximity of the mount 120 (or vice versa) in order to guide the device case no onto the mount 120 and otherwise remain inactive, such as to avoid interfering with items susceptible to magnetic interference (e.g., magnetic strips on credit cards, hotel keycards). In another implementation, the device case no can deactivate the electromagnets responsive to electrical contact between the insert 112 and the mount 120 in order to avoid interference with wireless charging while the device case 110 is docked in the mount 120 proximal or including a wireless charging circuit.

5. Mount

The mount 120 includes: the body 122 including the inner face 123 configured to mate with a rear face of the device case 110; a polygonal boss 124 extending from the inner face 123 of the body 122 and configured to insert into the rectangular bore 114 of the device case 110; a set of locking jaws 126 arranged on the polygonal boss 124 and configured to transiently mate with the set of undercut sections 116 of the insert 112 of the device case 110; and a second set of magnetic elements 128 arranged about the polygonal boss 124 in a second pattern and configured to transiently couple to the first set of magnetic elements 118 of the device case no to align the polygonal boss 124 with the rectangular bore 114 of the insert 112 of the device case no, to transiently retain the mount 120 against a rear face of the device case no, and to drive the set of locking jaws 126 toward the set of undercut sections 116 of the insert 112.

The mount 120 can also include a spring configured to drive the set of locking jaws 126 into a closed position to mechanically engage the (subset of) undercut sections 116 and thus transiently retain the mount 120 against the rear face of the device case no. The mount 120 can further include a locking control 130 manually operable to release all or a subset of the locking jaws from adjacent undercut sections 116 in the insert 112.

The mount 120 can be assembled in multiple configurations, as further described below. For example, a mount 120 in a first configuration can be configured to mount a device to a bicycle handlebar. Alternatively, a mount 120 in a second configuration can be configured to mount a device to a wall.

5.1 Polygonal Boss

The mount 120 includes a polygonal boss 124 extending from the inner face 123 of the body 122 of the mount 120 and configured to insert into the rectangular bore 114 of the device case 110. The polygonal boss 124 can be configured to fit into the rectangular bore 114 to couple the mount 120 with the device case no and thus constrain movement of the polygonal boss 124 within a plane defined by the polygonal boss 124 relative to the device case no and constrain rotation of the mount 120 relative to the device case no.

In one implementation, the mount 120 includes the polygonal boss 124 defining a square cross-section with radiused corners. In this implementation, the device case no can include the insert 112 defining the rectangular bore 114 defining a square frustrum tapering inwardly toward the rear face of the device case no and comprising radiused corners. The polygonal boss 124 with square cross-section and radiused corners can therefore insert into the rectangular bore 114 defining the square frustrum to couple the device case no with the mount 120.

In one variation, the mount 120 includes an elastic guard 125 arranged about the polygonal boss 124 and configured to abut surfaces of the polygonal boss 124 to surfaces of the insert 112 (in order to stabilize the polygonal boss 124 within the insert 112. By abutting surfaces of the polygonal boss 124 and the insert 112 and thus eliminating gaps between these surfaces, the elastic guard 125 can prevent wear and tear on the polygonal boss 124 and the insert 112 by limiting movement (e.g., rattle) of the polygonal boss 124 and the insert 112 when coupled and limiting grinding of the polygonal boss 124 and insert 112 against one another. Further, the elastic guard 125 can limit noise generated by movement of the polygonal boss 124 within the insert 112. For example, the mount 120 can include a rubber guard arranged about a perimeter of the polygonal boss 124 configured to fill any gaps between the polygonal boss 124 of the mount 120 and the insert 112 of the device case 110 when the mount 120 and device case 110 are coupled. When a user couples her mobile device to a mount 120 in her car, the rubber guard 125 around the polygonal boss 124 can prevent noise generation caused by the polygonal boss 124 rattling within the rectangular bore 114 of the insert 112 while the user drives her car. In another example, the mount 120 includes a rubber landing pad arranged about the polygonal boss on the inner face 123 of the body 122 configured to abut surfaces of the polygonal boss 124 and the inner face 123 of the body 122 to surfaces of the device case no, including surfaces of the insert 112.

5.1.1 Square Boss

In one implementation, the mount 120 includes a polygonal boss 124 defining a square cross-section with radiused corners. In this implementation, the device case no can include an insert 112 defining a rectangular bore 114 defining a square frustrum including radiused corners. The polygonal boss 124 with square cross-section (or "square boss") can be configured to define a cross-sectional area approximately equivalent or slightly less than a cross-sectional area of an outer face of the rectangular bore 114 of the insert 112, the outer face bordered by a lip of the rectangular bore 114 and corresponding to a smallest cross-section of the rectangular bore 114, such that the square boss can insert into and fit within the rectangular bore 114 with minimal gaps between the square boss and the outer face of the rectangular bore 114. The square boss can therefore insert into the rectangular bore 114 defining the square frustrum to couple the device case no with the mount 120 and constrain rotation of the device relative to the mount 120. This square boss can constrain rotation of the mount 120 relative to the device case 110 when inserted into the rectangular bore 114 of the insert 112 of the device case no. However, the square boss does not constrain lateral translation of the mount 120 outward from the device case no. Therefore, in one configuration, the mount 120 includes a set of locking jaws 126 arranged on the square boss in order to constrain lateral translation of the mount 120 outward from the device case no.

5.1.2 Octagonal Boss

In one implementation, the mount 120 includes a polygonal boss 124 defining an octagonal cross-section. In this implementation, the device case no can include an insert 112 defining the rectangular bore 114 defining a square frustrum tapering inwardly toward the rear face of the device case no, such that the insert 112 defines a set of undercut sections 116 about the rectangular bore 114. The polygonal boss 124 with octagonal cross-section (or "octagonal boss") can: be configured to insert into the rectangular bore 114 of the insert 112 of the device case no in a first orientation and rotate to a second orientation to lock the octagonal boss within the rectangular bore 114; define a set of non-beveled faces (e.g., 4 non-beveled faces) approximately perpendicular to the device case no; and define a set of beveled faces (e.g., 4 beveled faces) configured to mate with the set of undercut sections 116 about the rectangular bore 114 when the octagonal boss is in the second orientation. Therefore, when inserted into the rectangular bore 114 of the device case 110, the octagonal boss can constrain the mount 120 in translation relative to the device case 110.

Figure 30A:
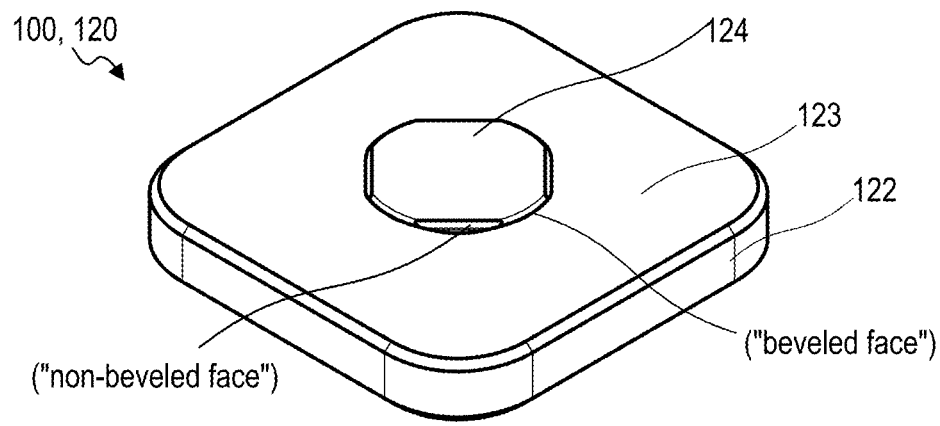
FIGS. 30A, 30B, and 30C are schematic representations of the mounting system.
Figure 30B:
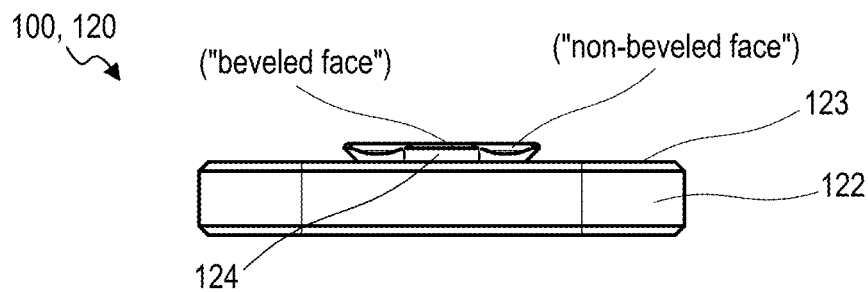
Figure 30C:
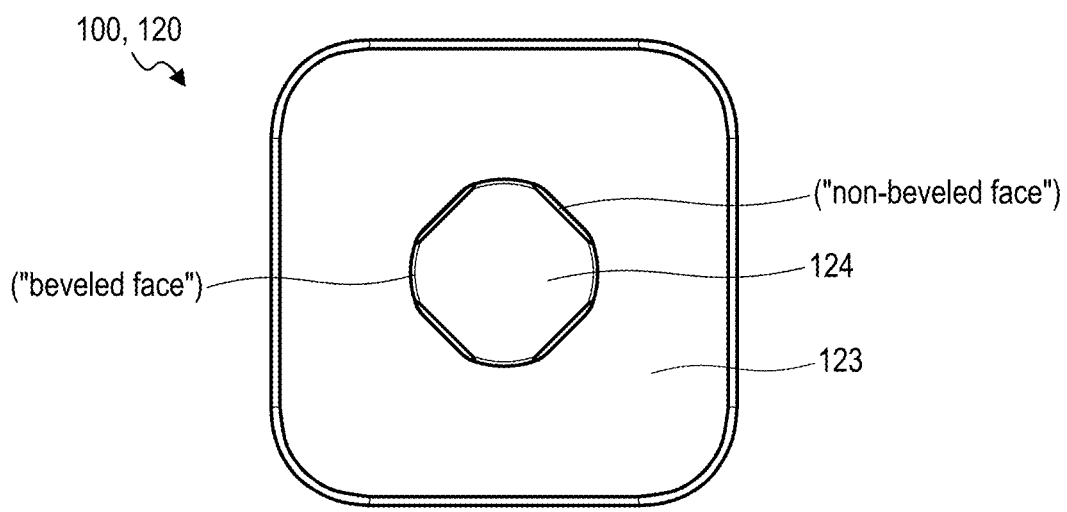

For example, as shown in FIGS. 30A, 30B, and 30C, a mount 120 can include an octagonal boss defining eight faces about the octagonal boss, these eight faces including four non-beveled faces and four beveled-faces, each beveled face bordering two non-beveled faces and visa versa. A user may align her mobile phone housed within a device case 110 with the mount 120 to insert the octagonal boss of the mount 120 into the rectangular bore 114 of the insert 112 of the device case 110 in the first orientation, such that the four non-beveled faces of the octagonal boss approximately align with a lip of the rectangular bore 114 and the non-beveled faces of the octagonal boss are arranged in corners of the rectangular bore 114. Then, to lock the polygonal boss 124 into the rectangular bore 114, the user may turn her mobile phone 45-degrees (e.g., clockwise) to orient the octagonal boss in the second orientation such that the four non-beveled faces of the octagonal boss are arranged in corners of the rectangular bore 114 and the four beveled-faces mate with the set of undercut sections 116 of the rectangular bore 114.

Further, the second set of magnetic elements 128 in the mount 120 arranged about the octagonal boss can couple to the first set of magnetic elements 118 in the device case 110 to further lock the octagonal boss within the rectangular bore 114. For example, the mount 120 can be configured such that the second set of magnetic elements 128 in the mount 120 magnetically couple with the first set of magnetic elements 118 in the device case 110 upon rotating the octagonal boss into the second configuration. Therefore, when the user rotates the octagonal boss from the first orientation to the second orientation, the user may feel the magnetic pull between the sets of magnetic elements in the device case 110 and the mount 120 and thus receive feedback that the device case 110 is securely coupled to the mount 120. Magnetic forces between the first and second set of magnetic elements 128 may also assist the user in rotating the octagonal boss from the first orientation toward the second orientation. For example, once the user has inserted the octagonal boss of the mount 120 into the rectangular bore 114 of the insert 112 of the device case 110 in the first orientation, the second set of magnetic elements 128 in the mount 120 can cooperate with the first set of magnetic elements 118 in the device case 110 to drive the octagonal boss toward the second orientation.

5.2 Magnetic Elements in the Mount

The mount 120 can include a set of magnetic elements arranged about the polygonal boss 124 (e.g., within the body 122)—arranged in a pattern corresponding to the pattern of the first set of magnetic elements 118 in the device case no—configured to magnetically couple to the first set of magnetic elements 118 in the device case no. Generally, the second set of magnetic elements 128 can cooperate with the first set of magnetic elements 118 to: align the polygonal boss 124 with the rectangular bore 114 of the insert 112; align the set of locking jaws 126 with the set of undercut sections 116 in the rectangular bore 114, and engage the set of undercut sections 116 against the set of locking jaws 126 to transiently transition the set of locking jaws 126 into the open position and displace the set of locking jaws 126 around the set of undercut sections 116. In particular, the second set of magnetic elements 128 magnetically couple with the first set of magnetic elements 118 to engage the set of locking jaws 126 into a closed (locked) position, such that the device case 110 is fixed to the mount 120 via complementary mechanical and magnetic forces.

5.2.1 Ejector

In one variation, the mount 120 can include an ejector operable in a retracted position and an advanced position and configured to transiently engage surfaces of the insert 112 in the advanced position to drive a portion of the device case 110 away from the mount 120. The ejector can transition from the retracted position to the advanced position to elevate surfaces of the insert 112 away from surfaces of the mount 120 to separate a first subset of magnetic elements—in the first set of magnetic elements 118—from a second subset of magnetic elements—in the second set of magnetic elements 128—to a first magnetic separation distance defining a disengagement configuration of the mounting system 100. In one implementation, the ejector—in the advanced position—can trigger separation of the device case 110 from the mount 120 to a first magnetic separation distance defined by the strength of the magnetic force between the first subset of magnetic elements and the second subset of magnetic elements (e.g., a distance at which the magnetic force is equal to less than 50% of the maximum magnetic force at the retracted position).

In one implementation, the ejector can include a user interface (e.g., a lever, paddle) actuatable in a direction orthogonal to a plane defined by the insert 112 and the mount 120 surface (e.g., in the same direction that the device case 110 disengages from the mount 120). For example, the user may—using a single motion—actuate an ejector lever from the retracted position toward the device case 110 into the advanced position to simultaneously eject and remove the device case 110.

In one implementation, the ejector can define a lever extending beyond a perimeter defined by the device case 110, such that the user may visually locate the ejector from the front of the device case 110. In another implementation, the ejector (and/or locking control 130) can extend to a distance less than the perimeter defined by the device case 110 and engage with an ejector extension that—when coupled to the ejector—extends beyond the perimeter defined by the device case 110.

5.3 Locking Jaws

Generally, the set of locking jaws 126 can be operable in a closed position and an open position. In particular, the set of locking jaws 126 can interface with a set of undercut sections 116 of the insert 112 to mechanically secure the device case 110 to the mount 120. In particular, the set of locking jaws 126 can actuate via a spring mechanism configured to drive the set of locking jaws 126 into the closed position to latch the set of locking jaws 126 against the set of undercut sections 116 to retain the insert 112 proximal the mount 120 surface. In one implementation, the set of locking jaws 126 can actuate via a locking control 130 to drive the set of locking jaws 126 into the open position to release the set of locking jaws 126 from the set of undercut sections 116 to remove the insert 112 from the mount 120 surface.

5.3.1 Jaw Geometry

In one implementation, a locking jaw can pivot about a pivot axis (e.g., a pin) in the mount 120 to maneuver a curved hook section of the locking jaw around an undercut section to engage a flat face of the curved hook section with the undercut section. The flat face of the curved hook section can—when the locking jaw is in the closed position—define a complementary angle to the offset angle of the undercut section such that the flat face of the curved hook section and the undercut section can mate along a shared plane (or parallel planes).

In a similar implementation, a first undercut section, in the set of undercut sections 116 of the insert 112, can be configured to mate with a first beveled face of a first locking jaw, in the set of locking jaws 126, on the mount 120. In this implementation, the first jaw is mounted to and pivots about a pivot (e.g., a pin) arranged under the polygonal boss 124. A spring is laterally offset from the pivot and drives the first jaw upward to mate the first undercut section against the first beveled face of the first jaw and thus retain the polygonal boss 124 within the rectangular bore 114 of the insert 112.

In particular, in this implementation, the pivot can be located along (or near) a vector that intersects and is normal to the first undercut section of the first locking jaw and the first beveled face of the insert 112 when coupled to the device case 110. Because the pivot is located along this vector: the effective lever arm length of the insert 112 applied to the first locking jaw is null (or nearly null) a lever arm; and the effective torque applied on the first locking jaw by the insert 112—such as when the device case 110 is pulled or rotated—is null (or nearly null) and (nearly) decoupled from the magnitude of the force or torque applied to the device case 110. Furthermore, because the spring is laterally offset from the pivot, this effective torque applied on the first locking jaw by the insert 112 is less than the opposing torque applied to the first locking jaw by the spring such that the first locking jaw remains engaged to the insert 112 despite the magnitude of the force or torque applied to the device case 110. Thus, when a user pushes, pulls, or pivots the device case 110, the resulting torque to open the first locking jaw is (approximately) null, and the first locking jaw therefore does not rotate away from the insert 112. Therefore, the first locking jaw remains fixed in its closed position and retains the mount 120 in place over the device case 110 despite forces applied to the device case 110.

Furthermore, responsive to a downward force on the top of the first locking jaw over the first undercut section by the device case 110 during installation of the device case 110 onto the mount 120, the first locking jaw can pivot downward about the pivot, thereby withdrawing the first undercut section away from the mount 120 and enabling the device case 110—including the insert 112—to move downward toward the mount 120. In particular, the user may align the polygonal boss of the mount 120 with the rectangular bore 114 of the insert 112 of the device case 110 and press down. The force of the first undercut section of the insert 112 on the first locking jaw counters the spring and applies a torque to the first locking jaw, thereby rotating the first locking jaw downward about the pivot to open the first locking jaw to accept the first undercut section of the insert 112. The first undercut section of the insert 112 slides along the apex of the first locking jaw, over the first beveled face as the first locking jaw opens, and eventually drops past the apex of the first locking jaw to seat under the first locking jaw with the first undercut section of the insert 112 positioned against the first beveled face of the first locking jaw and with the base of the polygonal boss 124 now in contact with the base of the insert 112. The spring then automatically drives the first locking jaw upward to positively clutch the insert 112.

As described above in this implementation, the mount 120 can include a single locking jaw. Alternatively, the mount 120 can include multiple locking jaws (e.g., two locking jaws), each locking jaw defining the geometry and operable as described above for the single locking jaw.

Because of this geometry, tips of the set of jaws only move away from a device housed within the device case 110 when retracted from the insert 112. Therefore, the set of jaws can clear the insert 112 and the device case 110 when actuated without any gaps between the insert 112 and a back surface of the device. Therefore, the insert 112 can be configured to sit approximately flush with a back surface of a device housed within the device case no, thus minimizing the thickness of the device case no by eliminating a gap between the insert 112 and the back surface of the device.

5.3.2 Single Locking Jaw

In the foregoing implementations, the set of locking jaws 126 includes one operable jaw (e.g., a spring-loaded jaw operable via the locking control 130) and one non-operable jaw (e.g., a fixed or spring-loaded jaw isolated from the locking control 130) such that the mount 120 can define a single release direction of the device case no (e.g., in the direction of the one non-operable jaw). The single release direction can be defined in a particular direction with respect to the mount 120 (e.g., toward the top of the mount 120 (or "up") when the mount 120 is in an installed position). For example, if the single release direction is up, the user may engage the locking control 130 to actuate the one operable jaw to the open position and the device case no will remain held in place by the one non-operable jaw until the user removes the device case no from the mount 120 by lifting the device case no upwards. Furthermore, since the locking control 130 need only engage with one locking jaw, a less complex locking control 130 can be used, allowing for a simpler manufacturing process.

5.3.3 Two Locking Jaws

In another implementation, the set of locking jaws 126 includes two operable jaws, such that the mount 120 can define multiple release directions of the device case 110 (e.g., in any direction). For example, the locking control 130 can engage both operable jaws simultaneously via a force applied symmetrically to both jaws to overcome the spring force—actuating both operable jaws to the open position—such that the device case 110 can be released from the mount 120 in any direction.

In another implementation, the set of locking jaws 126 includes three locking jaws (e.g. two operable jaws and one non-operable jaw, or three operable jaws, etc.). For example, the set of locking jaws 126 can include two operable jaws to mechanically retain the device case no to the mount 120 and one non-operable jaw to define a single release direction. In yet another implementation, the set of locking jaws 126 includes four operable jaws and a locking control 130 that enables release in a particular direction (e.g., releases three jaws opposite the locking control 130).

5.3.3 Multiple Locking Jaws

In another implementation, the set of locking jaws 126 includes multiple jaws on each side of the rectangular bore 114, such that partial locking of the device case no to the mount 120 occurs prior to full insertion of a full side of the set of locking jaws 126 (e.g., only one jaw of three on a side engages, so partial mechanical force locks the device case no to the mount 120 prior to full insertion of all jaws into the rectangular bore 114).

5.4 Locking Control

The mount 120 can include a locking control 130 actuatable to transition a first locking jaw—in the set of locking jaws 126—from the closed position to the open position to release the first locking jaw from a first undercut section in the set of undercut sections 116. Generally, the locking control 130 can engage with a release interface of the first locking jaw to pivot the first locking jaw about the pivot axis and around the first undercut section such that the device case 110 is no longer mechanically fixed to the mount 120 (e.g., the device case 110 is secured only via magnetic force). In one implementation, the locking control 130 can actuate along the plane defined by the back of the device case 110 (e.g., orthogonal to the magnetic force) to maintain a lower profile for the mounting system 100 by keeping the actuation of the locking control 130 fully restrained to an envelope defined by the device case 110 and the mount 120.

In another implementation, the locking control 130 (or a set of locking control 130s) can engage with multiple jaws simultaneously (e.g., apply a force symmetrically across the set of locking jaws 126 to release the set of locking jaws 126 uniformly). For example, the locking control 130 can define a user interface (e.g., a button) on a first side of the mount 120 and—in response to the user depressing the button—engage with a set of release features on the set of locking jaws 126 to drive each of the locking jaws to the open position, allowing the user to remove the device case 110 from the mount 120 in the direction of any locking jaw in the open position.

In another implementation, the user interface of the locking control 130 can extend across an area defined by a first full side of the device case 110, such that the user may engage with the locking control 130 at any point along the first full side of the device case 110. In yet another implementation, the user interface of the locking control 130 can extend across an area defined by each full side of the device case 110, such that the user may engage with the locking control 130 at any point along any side of the device case 110.

In another implementation, the locking control 130 includes a release spring to define a locking control 130 stiffness, such that the stiffness of the locking control 130 is fully decoupled from the spring force required to drive the locking jaws to the open position. For example, the release spring can define a locking control 130 stiffness requiring an input force twice that of the magnetic force, such that overcoming the magnetic force to remove the device case no from the mount 120 can feel relatively easy compared to engaging the locking control 130.

In another implementation, the ejector and the locking control 130 can form a single unit, such that the ejector can drive each of the locking jaws to the open position and simultaneously drive the device case no to a disengagement configuration in a single motion. For example, the ejector can define a lever coupled to a slidable release and—in response to engagement of the lever by the user—the lever can: actuate the slidable release to engage the release interfaces of the set of locking jaws 126 and drive the locking jaws into the open position; and pivot against an ejector pivot to drive the device case no to the disengagement position.

6. Inductive Charging

In one variation, as shown in FIGS. 7 and 28A-F, the mounting system 100 includes a charging element 150 configured to inductively charge a device installed within the device case no. For example, the mounting system 100 can include an inductive coil arranged within the mount 120 and configured to inductively charge a smartphone installed within the device case 110.

The charging element 150 within the mount 120 can be configured to align with a charge receiving element within a mobile device housed within the device case 110 via magnetic coupling of the first set of magnetic elements 118 in the device case 110 and the second set of magnetic elements 128 in the mount 120. For example, the device case 110 can be configured to include a first set of magnetic elements 118 arranged in a first pattern about an area of the device case no corresponding to a charge receiving element in a mobile device transiently housed within the device case no. The mount 120 can include a charging element 150 (e.g., an RX coil) and a second set of magnetic elements 128 arranged about the charging element 150 in a second pattern, such that the first set of magnetic elements 118 in the device case no transiently couple to the second set of magnetic elements 128 in the mount 120, thereby aligning a surface area of the device case no corresponding to the charge receiving element with a surface area of the mount 120 corresponding to the charging element 150 and enabling wireless charging of the mobile device.

In one implementation, the charging element 150 and the second set of magnetic elements 128 are housed within the body 122 of the mount 120. The charging element 150 can be coupled to a printed circuit board (or "PCB") housed within the body 122. The body 122 can include a chassis configured to house the charging element 150, the PCB, and the second set of magnetic elements 128. For example, the body 122 can include a chassis formed of a substantially non-magnetic material (e.g., aluminum) and configured to house the charging element 150, the PCB, and the second set of magnetic elements 128. In this implementation, the body 122 can also include a landing pad formed of a polymer material (e.g., polyurethane), defining the inner face 123 of the body 122, and configured to couple to a rear face of the device case no.

6.1 Inductive Charging: Insulator Insert

The mount 120 can include an insulator insert 152 configured to shield the charging element 150 from the second set of magnetic elements 128 in the mount 120 and focus the magnetic field output by the charging element 150 toward the polygonal boss 124. In one implementation, the mount 120 includes a ferrite insert (e.g., a soft ferrite insert) configured to shield an induction coil from the second set of magnetic elements 128 surrounding the induction coil within the mount 120.

The insulator insert 152 can be molded to fit the charging element 150 and the second set of magnetic elements 128 within the insulator insert 152. For example, the mount 120 can include: a ferrite insert defining a central cavity 154 and a set of receptacles 156 arranged in a first pattern about the central cavity 154; an induction coil arranged within the central cavity 154; and a second set of magnetic elements 128 arranged within the set of receptacles 156. By molding the insulator insert 152 to fit the charging element 150 and the second set of magnetic elements 128, the insulator insert 152 acts as a barrier between the charging element 150 and the second set of magnetic elements 128. Thus, the insulator insert 152 can shield the charging element 150 from the second set of magnetic elements 128 to: maximize retention between magnets in the first set of magnetic elements 118 in the device case 110 and the second set of magnetic elements 128 arranged within the insulator insert 152; minimize interference of the second set of magnetic elements 128 with an induced magnetic field of the induction coil; and focus a magnetic field output by the inductive coil toward the polygonal boss 124 and toward a receiving coil on a mobile device housed within the device case no to maximize wireless power transfer.

The insulator insert 152 can define a first depth (e.g., less than 5 millimeters) such that the central cavity 154 defines a second depth (e.g., less than 4 millimeters) and the set of receptacles 156 define a third depth (less than 4 millimeters), the second depth and the third depth less than the first depth. The charging element 150 (e.g., the induction coil) can be configured to exhibit a cylindrical shape exhibiting approximately the second depth of the central cavity 154 when placed within the central cavity 154. Similarly, the second set of magnetic elements 128 can be configured to exhibit a 3D-shape (e.g., a 3D trapezoidal shape) exhibiting approximately the third depth of the set of receptacles 156. Because the second set of magnetic elements 128 are configured to transiently couple to the first set of magnetic elements 118 in the device case 110, the second set of magnetic elements 128—arranged in a pattern corresponding to the first set of magnetic elements 118—define a maximum area corresponding to the second set of magnetic elements 128 and the charging element 150. Therefore, by including a charging element 150 and magnetic elements exhibiting 3D geometry, a volume of the charging elements 150 and a volume of these magnetic elements are increased, thus increasing inductive charging output by the charging element 150 and magnetic attractive forces between the second set of magnetic elements 128 in the mount 120 and the first set of magnetic elements 118 in the device case 110.

6.2 Inductive Charging: Magnetic Elements in the Mount

Magnetic elements in the device case 110 and the mount 120 can be configured to minimize interference with inductive charging and maximize magnetic forces between magnetic elements in the first set of magnetic elements 118 and the second set of magnetic elements 128. To maximize magnetic attraction between the first set of magnetic elements 118 in the device case 110 and the second set of magnetic elements 128 in the mount 120, each magnetic element in the second set of magnetic elements 128 can be configured to sit in a particular position within the mount 120 such that a center of the magnetic element, in the second set of magnetic elements 128, falls within a threshold distance of a center of a corresponding magnetic element in the first set of magnetic elements 118 in the device case 110.

In one implementation, the device case 110 includes a second set of magnetic elements 128 arranged about the charging element 150 and configured to maximize an area (e.g., a circular area) corresponding to the charging element 150 to maximize inductive charging. Therefore, the second set of magnetic elements 128 can define a particular shape (e.g., trapezoidal, crescent-shaped) and exhibit a particular spacing between magnetic elements and the charging element such that the second set of magnetic elements 128 can transiently couple to the first set of magnetic elements 118 of the device case 110 and limit interference with inductive charging. For example, to maximize this area—configured to fit the charging element 150—inset from the second set of magnetic elements 128, each magnetic element in the second set of magnetic elements 128 can include relieved corners on an inner face of the magnetic element.

In one implementation, the mount 120 includes a second set of trapezoidal magnetic elements arranged about the charging element 150, such that an area of these trapezoidal magnetic elements is maximized while distances between interior surfaces of the trapezoidal magnetic elements and the charging element 150 are also maximized.

For example, the mount 120 can include four trapezoidal magnetic elements arranged about a circular charging element 150 within a square body of the mount 120, each trapezoidal magnetic element located within a corner of the square body. The mount 120 can be configured such that each trapezoidal magnetic element defines an inner face facing the charging element 150 and extending in each direction toward interior surfaces of the square body offset by 90 degrees, the inner surface of the trapezoidal magnetic element exhibiting a length greater than a length of a parallel outer surface of the trapezoidal magnetic element. Each of the four trapezoidal magnetic elements can include relieved inside corners about the inner face of the trapezoidal magnetic element to maximize a circular area corresponding to the charging element 150. Thus, each trapezoidal magnetic element occupies a maximum area within each corner of the square body 122 while reducing proximity between inner surfaces of the trapezoidal magnetic elements and the charging element 150.

In another implementation, the mount 120 includes a second set of crescent-shaped magnetic elements 128 arranged about the charging element 150, such that distances between interior surfaces of the crescent-shaped magnetic elements and the charging element 150 are further increased.

6.3 Inductive Charging: Device Case

Furthermore, because the insert 112 is relatively thin (e.g., three millimeters or less), and/or is formed of a substantially non-conductive, non-ferromagnetic or low magnetic permeability material exhibiting minimal electromagnetic shielding, the insert 112 may interfere minimally with local electromagnetic radiation, thereby enabling a wireless charging signal (e.g., an electromagnetic field output by a wireless charging pad or station) to pass through the device case no and to reach a mobile device—housed in the device case no—with sufficient amplitude to recharge the mobile device. More specifically, because the insert 112 is relatively thin, the device case 110 may minimally offset the mobile device contained therein from an adjacent wireless charging pad and, because the insert 112 can be formed of a material exhibiting minimal electromagnetic shielding, the device case 110 may enable the mobile device to be recharged via the wireless charging pad or station even when housed in the device case no.

In this variation of the mounting system 100 configured to support wireless charging of the mobile device, the first set of magnetic elements 118 can also be arranged in a pattern relative to a wireless charging induction coil integrated into the mobile phone. For example, the first set of magnetic elements 118 can be located in the device case 110 such that the first set of magnetic elements 118 fall near or outside of a perimeter of an induction coil of a wireless charging circuit of the mobile device once the mobile device is loaded into the device case no. This arrangement of the first set of magnetic elements 118 outside of the wireless charging area of the mobile device may reduce interference of the device case no with an electromagnetic field generated by the induction coil of a wireless charging pad (or other wireless charging station), thereby enabling the mobile device to be recharged wirelessly even when installed in the device case no and allowing for compliance with wireless power specification standards (e.g. WPC QI).

7. Emplacement Mechanism

In one variation, the mount 120 also includes an emplacement mechanism 140 configured to affix the mount 120 to a surface such as: a vehicle air vent; a vehicle dashboard; a bicycle frame; bicycle or motorcycle handlebars; a wall; a desk; a table; an armband; a belt; or a waistband. For example, the emplacement mechanism 140 can be configured to permanently or transiently attach to a surface via a clamp, fasteners, a suction cup, an adhesive, or other surface anchor. In another example, the emplacement mechanism 140 can include a belt clip configured to couple the mount 120 to a belt or waistband or an armband configured to couple the mount 120 to a user's forearm.

The mount 120 can also be coupled to the emplacement mechanism 140 via a pivot mechanism (e.g., a ball and socket joint) or multiple pivot mechanisms to enable the mount 120 to be maneuvered relative to the emplacement mechanism 140 and the adjoining surface, such as by a user with a single hand and in a single motion immediately after locating the device case 110 on the mount 120.

8. Mount Configurations

In one variation, the mounting system 100 includes a set of mounts 120, each mount 120 assembled in a particular configuration. For example, a first mount 120, in the set of mounts 120, in a first configuration, can include: a first polygonal boss 124 extending from a first body 122 of the first mount 120 and configured to insert into a rectangular bore 114 of the device case no; a set of locking jaws 126 arranged on the first polygonal boss 124 configured to transiently constrain the first polygonal boss 124 within the rectangular bore 114; and a second set of magnetic elements 128 configured to transiently couple to a first set of magnetic elements 118 in the device case no. Alternatively, a second mount 120, in the set of mounts 120, in a second configuration, can include: a second polygonal boss 124 extending from a second body 122 of the second mount 120 and configured to insert into the rectangular bore 114 of the device case no; and a third set of magnetic elements configured to transiently couple to the first set of magnetic elements 118 in the device case no. In both configurations, the first and second mount 120 can include the first and second polygonal boss 124, respectively, to transiently constrain movement of the mounts 120 within a plane of each mount 120. However, the first mount 120 in the first configuration can further constrain the first polygonal boss 124 within the rectangular bore 114 of the device case no by constraining movement of the first polygonal boss 124 outward from the rectangular bore 114 via the set of locking jaws 126. Mounts 120 in the set of mounts 120 can be assembled in these different configurations based on a type of mount 120 (e.g., wall mount 120, car mount 120, bike mount 120, desktop charging mount 120) identified for each mount 120. Each of these different types of mounts 120—configured to mount the device case no to a particular surface—can include: the polygonal boss 124; the second set of magnetic elements 128; the set of jaws 126; the charging element 150; and/or a particular combination of these elements.

8.1 First Configuration: Polygonal Boss+Magnets

Figure 8A:
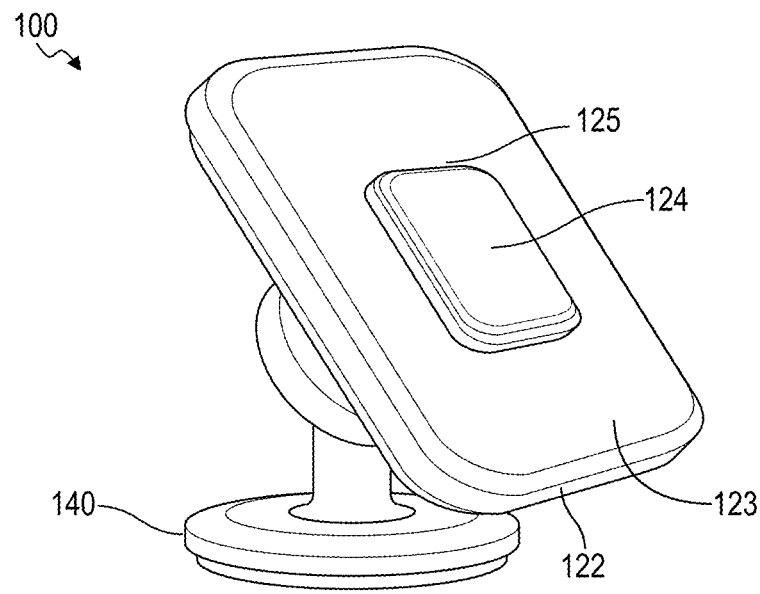
FIGS. 8A and 8B are schematic representations of the mounting system.

In a first configuration, as shown in FIG. 8A, the mount 120 includes: a polygonal (e.g., octagonal) boss 124 extending from the inner face and configured to insert into a rectangular bore 114 of the insert 112 of the device case no; and a second set of magnetic elements 128 configured to transiently couple to a first set of magnetic elements 118 arranged within the device case no. In the first configuration, the device case no can couple to the mount 120 via insertion of the polygonal boss 124 into the rectangular bore 114 of the insert 112 and attraction of magnetic elements in the first set of magnetic elements 118 to magnetic elements in the second set of magnetic elements 128.

In the first configuration, the polygonal boss 124 is configured to constrain the mount 120 in rotation relative to the device case no. The second set of magnetic elements 128 in the mount 120 can be configured to align with the first set of magnetic elements 118 in the device case no to strengthen the retention of the polygonal boss 124 within the rectangular bore 114 of the insert 112 by drawing the inner face of the mount 120 toward a back face of the device case 110. Thus, when coupled to the mount 120, the device case 110—and any mobile device housed within the device case 110—can be constrained in rotation relative to the mount 120 via the polygonal boss 124 and within a plane adjacent and parallel to a plane defined by the polygonal boss 124 via the first and second set of magnetic elements 128. For example, a user may couple her device case 110—including a mobile device housed within the device case 110—to a mount 120 in the first configuration by roughly aligning the polygonal boss 124 with the rectangular bore 114 of the insert 112 of the device case 110. The device case 110 can realign accordingly to insert the polygonal boss 124 into the rectangular bore 114 via attraction of the first and second set of magnetic elements 128. Once inserted, the polygonal boss 124 can constrain the mount 120 in rotation relative to the device case 110. The first and second set of magnetic elements 128 can cooperate to constrain the polygonal boss 124 within a plane parallel and intersecting a plane defined by the device case 110. However, the user may remove her device case 110 from the mount 120 in the first configuration by exerting a force, greater than the magnetic force between the first and second set of magnetic elements 128, on the device case 110 outward (e.g., orthogonal) from the mount 120.

In one implementation, the mount 120 in the first configuration includes: a square boss extending from the inner face 123 of the body 122 and configured to insert into the rectangular bore 114 of the device case 110; and a set of four magnets arranged about the polygonal boss 124 and configured to transiently couple to a first set of magnetic elements 118 of the device case 110 to transiently retain the mount 120 against a rear face of the device case 110. In this implementation, the square boss of the mount 120 can define a square cross-section with radiused corners. Similarly, the rectangular bore 114 of the insert 112 can define a square frustum defining radiused corners to match the square boss of the mount 120.

8.1.1 Variation: Vehicle Mount

In one variation, as shown in FIGS. 8A and 9A-13E, a mount 120 can be configured to couple the device case 110 to a surface in a vehicle, such as a dashboard, center console, and/or a vent. This mount 120 (or "vehicle mount 120") can be assembled in the first configuration including the polygonal boss 124 extending from the body 122 of the vehicle mount 120 and the second set of magnetic elements 128 configured to couple to the first set of magnetic elements 118 in a device case no. The car mount 120 in the first configuration can cooperate with the insert 112 of the device case no to retain the device case no and a device housed within the device case no while the vehicle is in motion.

For example, a user may couple her smartphone—housed within a device case no—to a vehicle mount 120 fixed to a dashboard in her car, by aligning a rear face of the device case no with the inner face 123 of the body 122 of the vehicle mount 120. A second set of magnets in the vehicle mount 120 can cooperate with a first set of magnets in the device case no to enable the user to quickly attach her smartphone to the mount 120 by drawing the polygonal boss 124 of the mount 120 into a rectangular bore 114 of the insert 112 of the device case no. As the user drives her car, the polygonal boss 124 can prevent her smartphone from rotating about the polygonal boss 124 and falling off the mount 120 while the magnetic forces between the first and second set of magnets restricts lateral movement of the smartphone off of the mount 120. Further, because the car mount 120 in the first configuration does not include a set of locking jaws 126, the user may place her mobile phone on the mount 120 and remove her mobile device from the mount 120 with less force and without searching for and/or pressing a release button(s), thus enabling the user to rapidly attach and detach her smartphone from the mount 120 with minimal effort and/or distraction.

A vehicle mount 120 can include an emplacement mechanism 140 configured to affix the mount 120 to a surface of the vehicle. For example, as shown in FIG. 8A, the vehicle mount 120 can include a pressure-sensitive adhesive backing configured to affix the vehicle mount 120 to a surface of a dashboard and/or console in a vehicle. A user may press the vehicle mount 120 onto a (flat) surface of the dashboard or console within her vehicle to semi-permanently affix the vehicle mount 120 to the vehicle. In another example, the vehicle mount 120 can include: an emplacement mechanism 140 defining a vent locking mechanism. The vent locking mechanism can include a set of vent jaws configured to spread to fill the area of a vent in a vehicle and pull the mount 120 inwards to securely lock the vehicle mount 120 in place to enable the mounting system 100 to remain in place if the car is subjected to turbulent conditions (e.g., a bumpy road or highway).

8.1.2 Variation: Wallet Mount

In one variation, as shown in FIGS. 15A-K, the device case 110 can be configured to couple to a mount 120 (or "wallet mount 120") including the body 122 defining a wallet. In this variation, the body 122 of the wallet mount 120 can be configured to function as a wallet. For example, the body 122 can include a sleeve configured to store a user's cash, credit cards, and/or driver's license.

The wallet mount 120 can be assembled in the first configuration including a polygonal boss 124 extending from the inner face 123 of the body 122 and a second set of magnetic elements 128 configured to couple to the first set of magnetic elements 118 in a device case 110. The wallet mount 120 in the first configuration can cooperate with the insert 112 of the device case no to retain the device case no and a device housed within the device case no while the user carries around and/or uses her mobile device throughout her day. Because the wallet mount 120 is relatively lightweight, the polygonal boss 124 and the second set of magnetic elements 128 may be sufficient to retain the polygonal boss 124 within a rectangular bore 114 of the insert 112 without a set of jaws 126. Alternatively, the wallet mount 120 can also include a set of jaws 126 arranged on the polygonal boss 124.

For example, a user may couple her smartphone—housed within a device case no—to a wallet mount 120 by aligning a rear face of the device case no with the inner face 123 of the body 122 of the wallet mount 120. To prevent the wallet mount 120 from detaching from the device case no, the wallet mount 120 can include an octagonal boss, as described above, to enable the user to lock the octagonal boss to the device case no and thus constrain the wallet mount 120 in five degrees of freedom on the device case no. The wallet mount 120 can also include a second set of magnetic elements 128 configured to transiently couple to a first set of magnetic elements 118 in the device case no to prevent rotation of the wallet mount 120 about the device case no—and thus prevent rotation of the octagonal boss within the rectangular bore 114 of the insert 112—thereby further constraining the wallet mount 120 to the device case no in a sixth degree of freedom.

The wallet mount 120 can be configured to minimize a gap between the back abutting surfaces of the sleeve(s) and device case 110 such that sleeves fall (nearly) flush with the device case 110. Therefore, the wallet mount 120 can include only magnetic elements and the polygonal boss—with no set of jaws—for retention to the device case 110, in order to limit thickness (or "profile") of the wallet mount 120. Therefore, by eliminating the set of jaws from the mount 120, the total thickness of the assembly when loaded with credit cards, cash, etc., is minimized, thereby limiting obstruction when a user inserts and removes her phone from her pocket.

8.2.2 Variation: Tripod Mount

In one variation, as shown in FIGS. 25A-26M, a mount 120 can be configured to couple the device case no to a tripod (e.g., a camera tripod). This mount 120 (or "tripod mount 120") can be assembled in the first configuration including the polygonal boss 124 extending from the body 122 of the tripod mount 120 and the second set of magnetic elements 128 configured to couple to the first set of magnetic elements 118 in the device case no. The tripod mount 120 can cooperate with the insert 112 of the device case no to retain the device case no and a device housed within the device case no while the user rotates (e.g., in x, y, and z directions) a head of the tripod to adjust a camera view and/or while the user moves the tripod.

A tripod mount 120 can include: an emplacement mechanism defining an adapter to quickly lock the device case no to a camera tripod. The adapter can define a base configured to engage with the head of camera tripod such that the tripod mount 120 can be removed by the user via a tripod camera lock or the locking control of the tripod.

For example, a user may couple her mobile device (e.g., tablet)—housed within a device case 110—to a tripod mount 120 set up outdoors on rough terrain. The user may couple her mobile device to the tripod mount 120 via aligning the rear face of the device case no with the inner face 123 of the body 122 of the tripod mount 120. A second set of magnets in the tripod mount 120 can cooperate with a first set of magnets in the device case no to enable the user to quickly attach her mobile device to the mount 120 by drawing the polygonal boss 124 of the mount 120 into a rectangular bore 114 of the insert 112 of the device case no. The tripod mount 120 can include an adapter coupled to the body 122 opposite the polygonal boss 124 and configured to attach to the head of the tripod via a camera lock of the tripod.

8.2 Second Configuration: Polygonal Boss+Magnets+Jaws

Figure 8B:
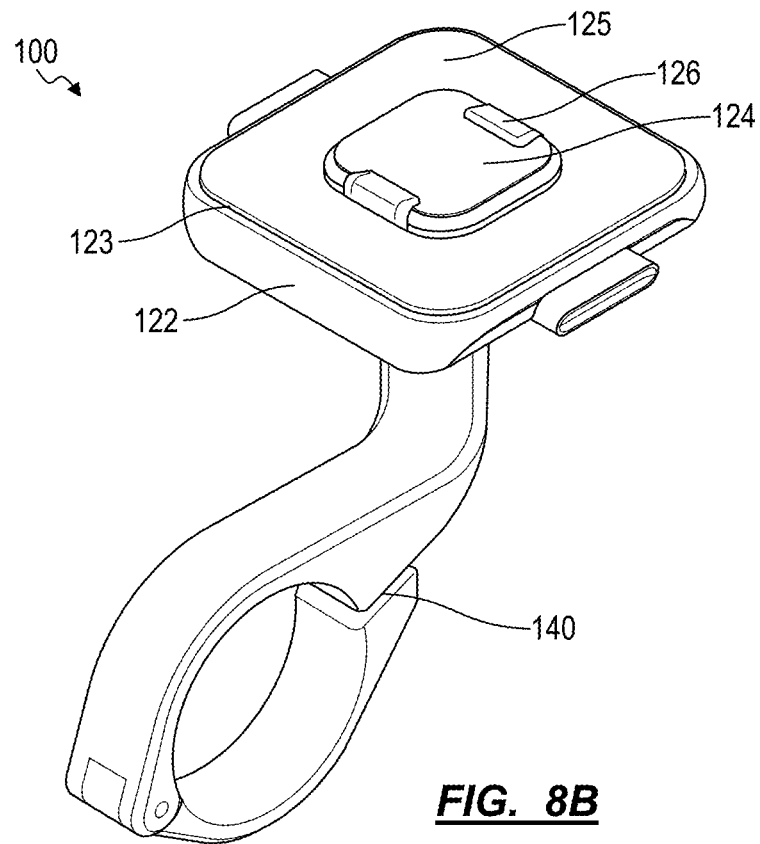
Figure 9A:
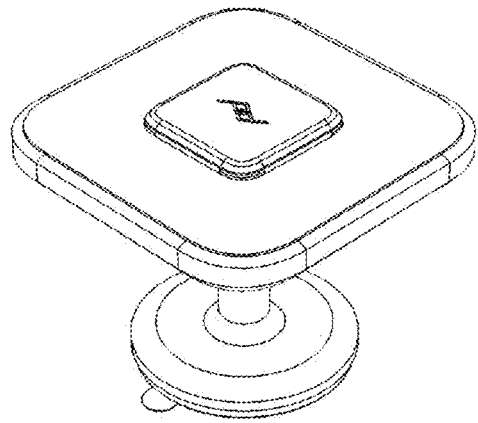
FIGS. 9A-9J are schematic representations of a vehicle mount.
Figure 9B:
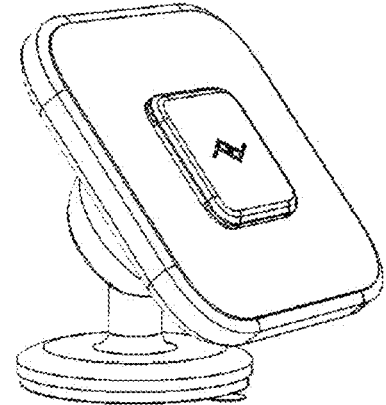
Figure 9C:
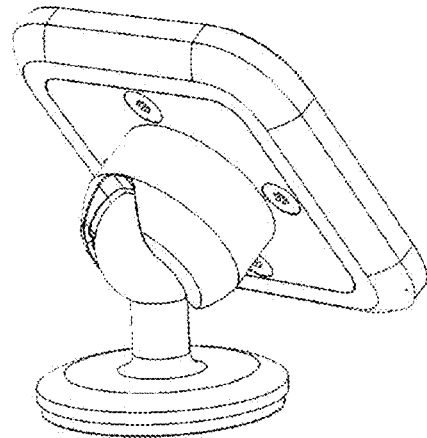
Figure 9D:
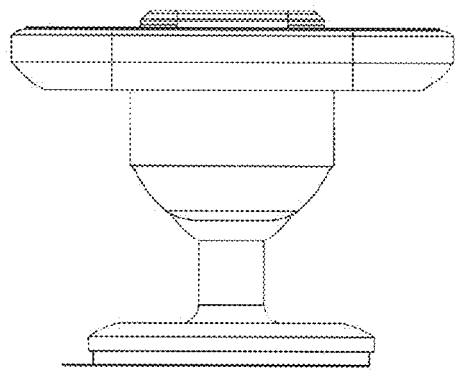
Figure 9E:
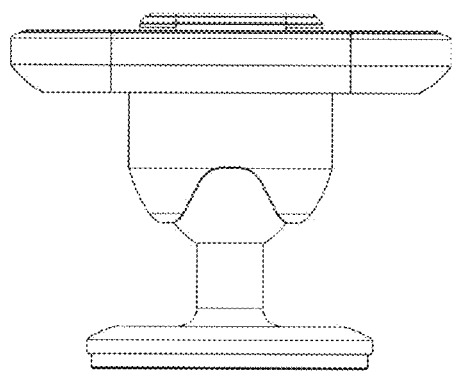
Figure 9F:
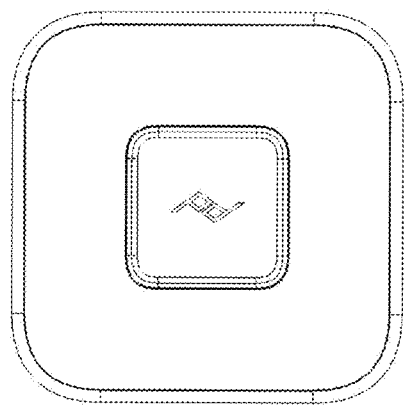
Figure 9G:
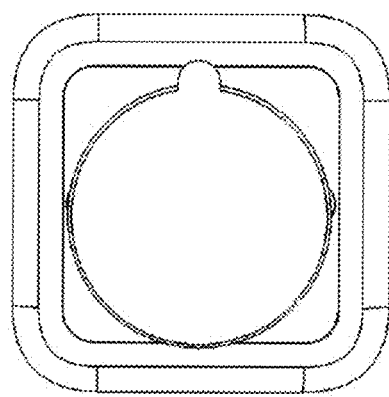
Figure 9H:
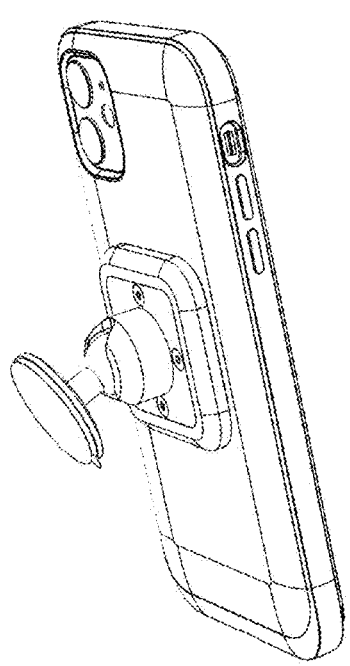
Figure 9I:
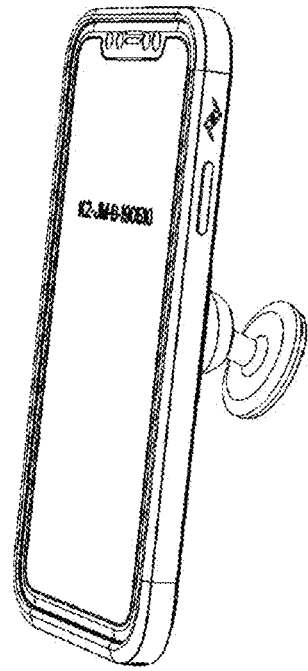
Figure 9J:
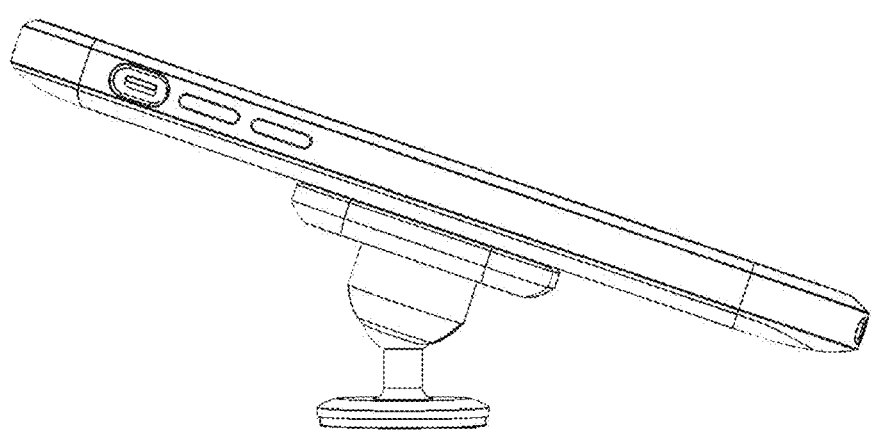
Figure 10A:
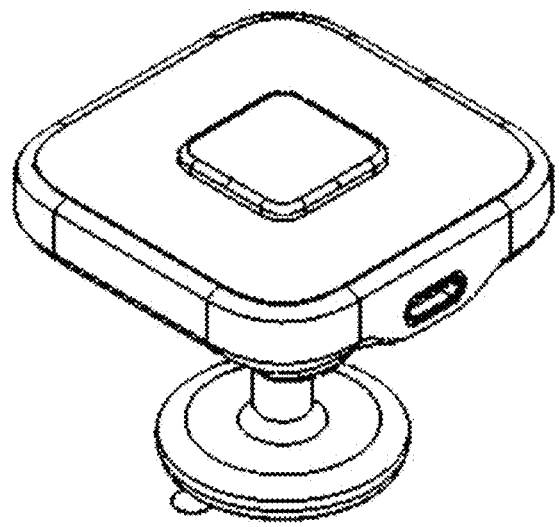
FIGS. 10A-10G are schematic representations of a vehicle mount.
Figure 10B:
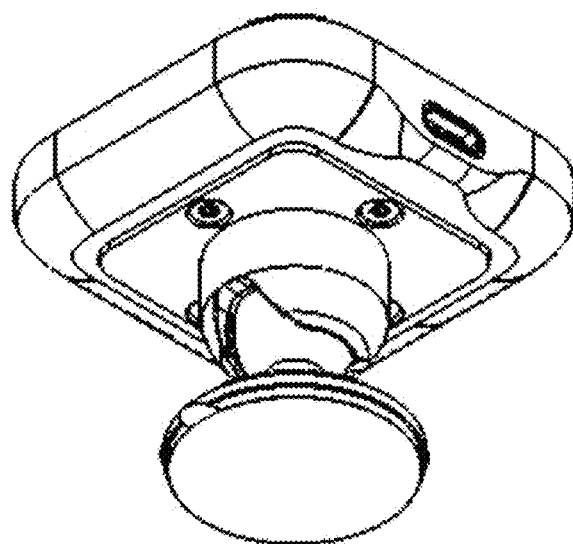
Figure 10F:
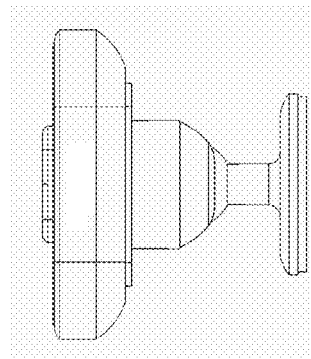
Figure 10C:
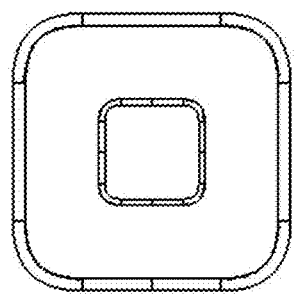
Figure 10E:
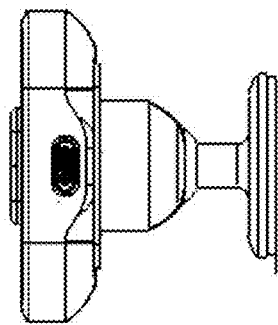
Figure 10G:
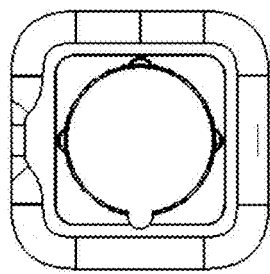
Figure 10D:
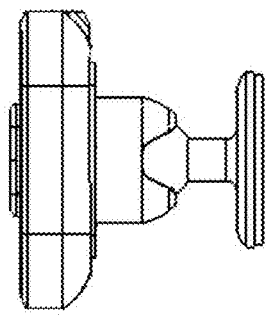
Figure 11B:
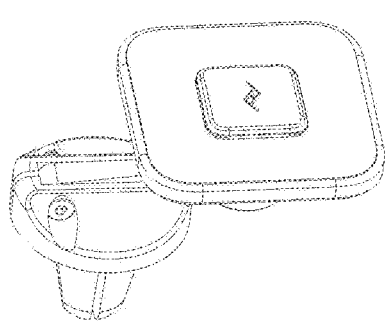
FIGS. 11A-11D are schematic representations of a vehicle mount.
Figure 11A:
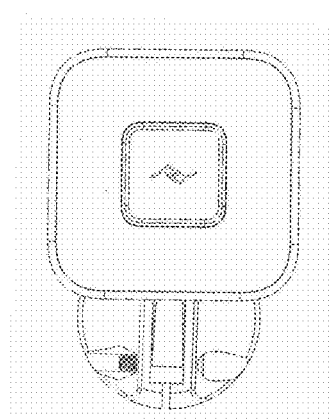
Figure 11D:
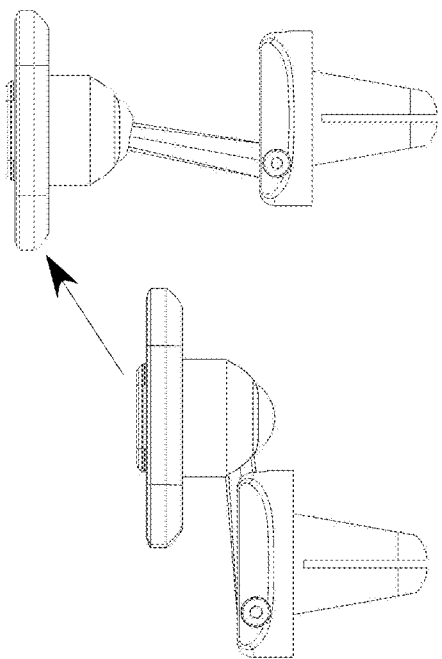
Figure 11C:
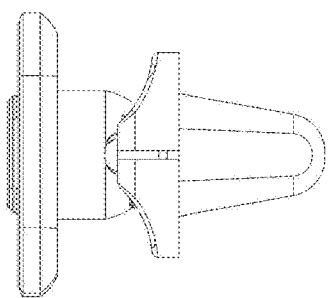
Figure 12C:
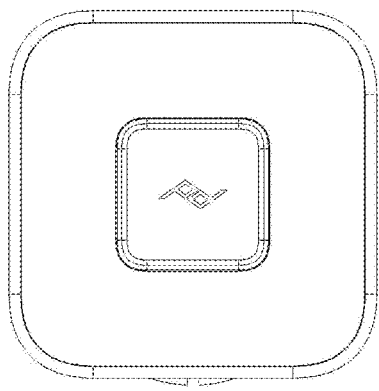
FIGS. 12A-12D are schematic representations of a vehicle mount.
Figure 12D:
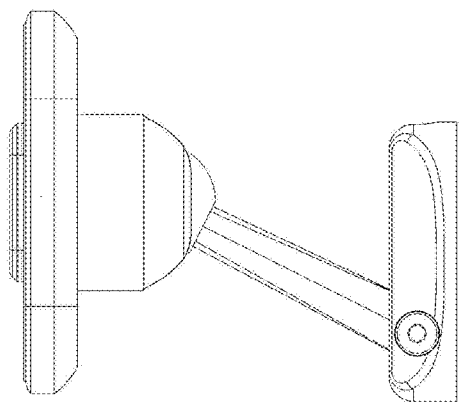
Figure 12A:
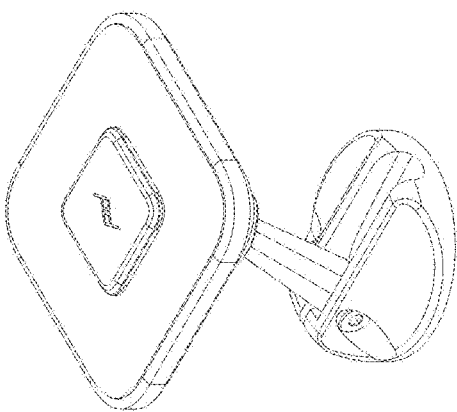
Figure 12B:
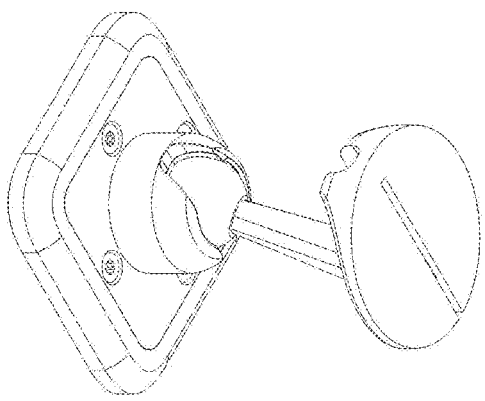
Figure 13E:
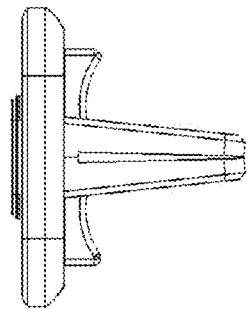
FIGS. 13-13E are schematic representations of a vehicle mount.
Figure 13C:
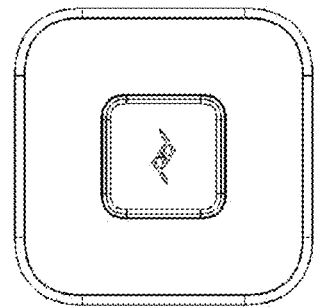
Figure 13D:
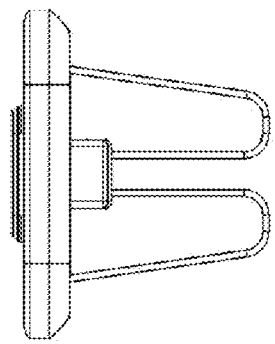
Figure 13A:
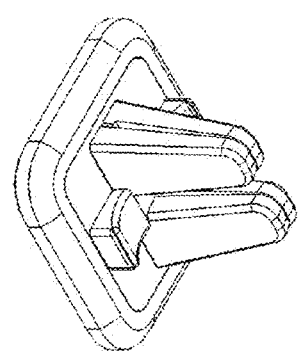
Figure 13B:
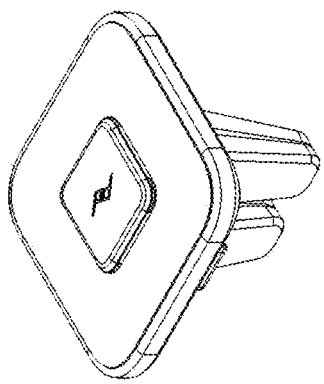
Figure 14A:
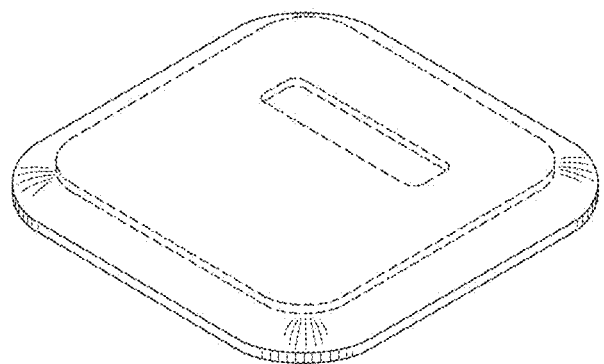
FIGS. 14A-G are schematic representations of a wall mount.
Figure 14B:
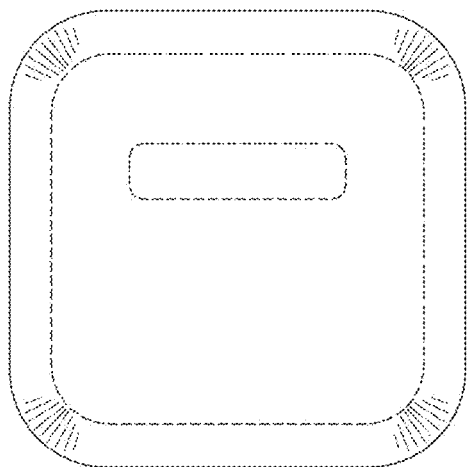
Figure 14C:
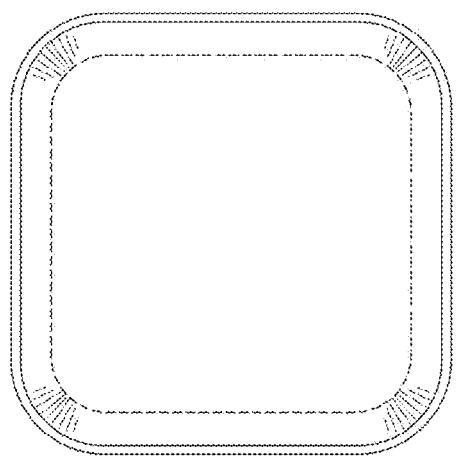
Figure 14D:
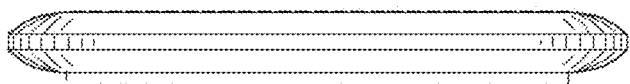
Figure 14E:
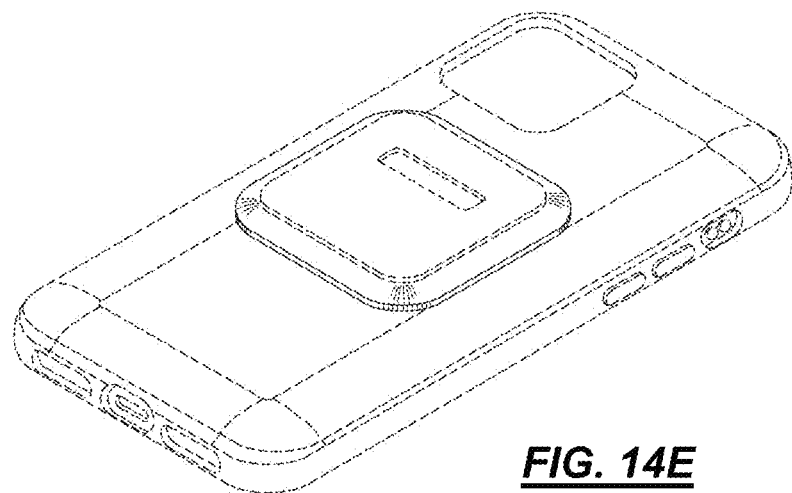
Figure 14F:
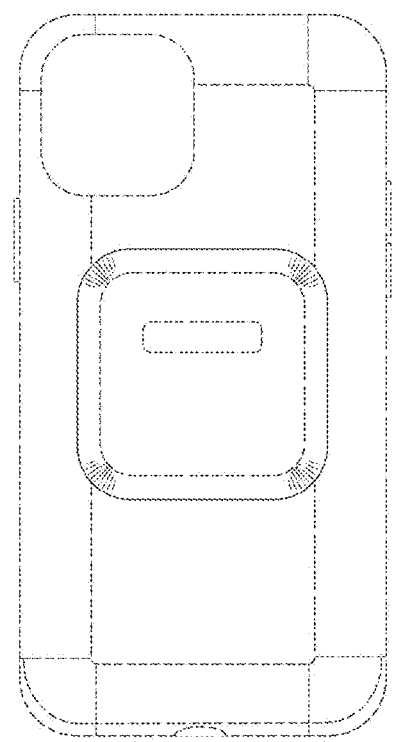
Figure 14G:
Figure 15A:
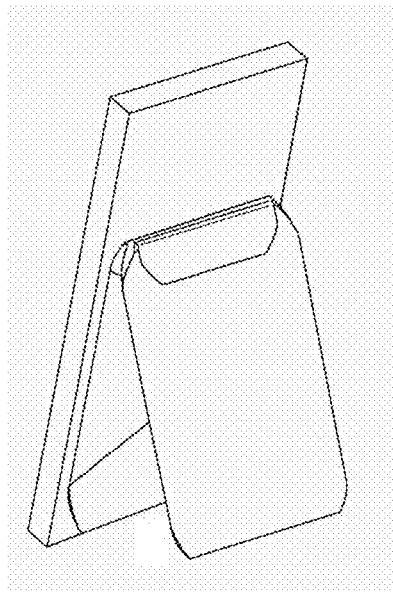
FIGS. 15A-L are schematic representations of a wallet mount.
Figure 15B:
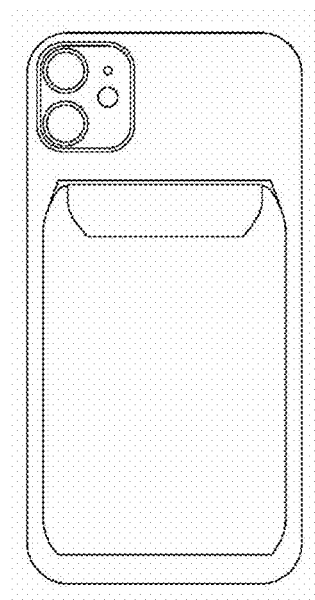
Figure 15C:
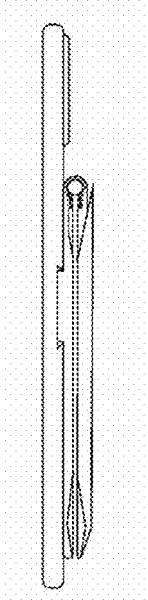
Figure 15F:
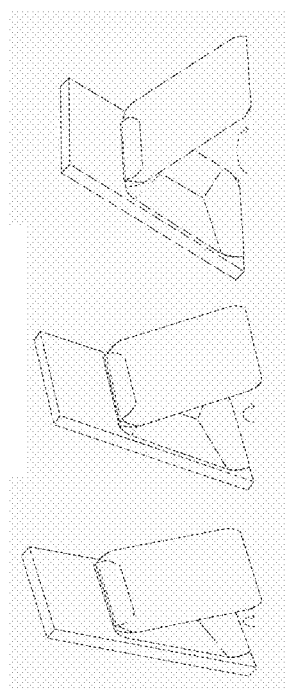
Figure 15G:
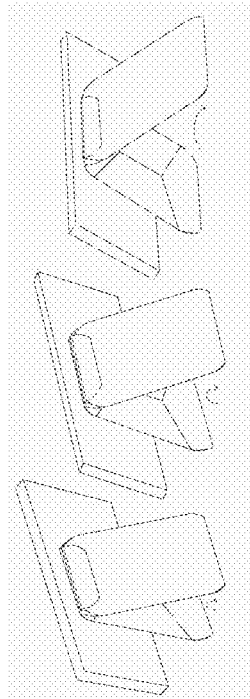
Figure 15E:
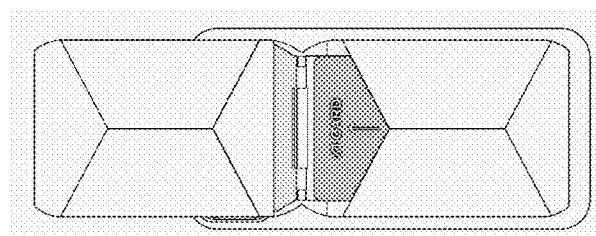
Figure 15D:
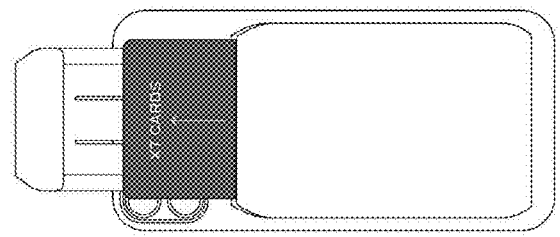
Figure 15L:
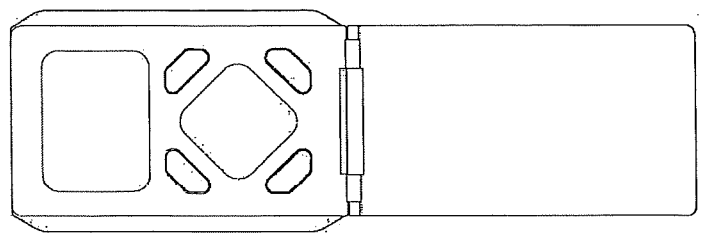
Figure 15K:
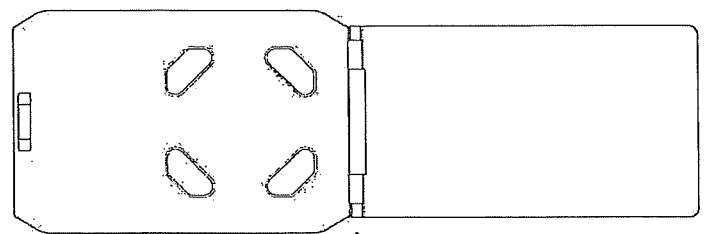
Figure 15J:
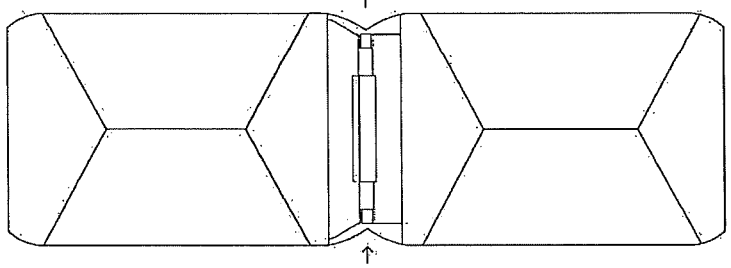
Figure 15I:
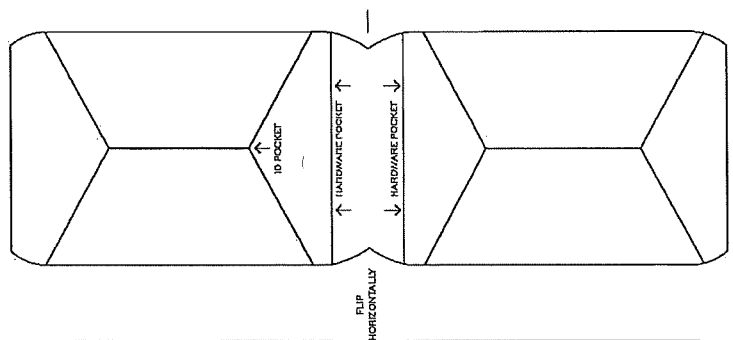
Figure 15H:
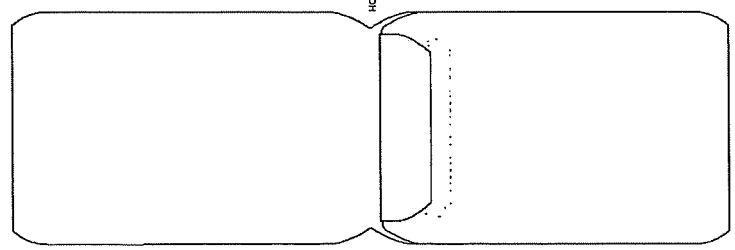
Figure 16G:
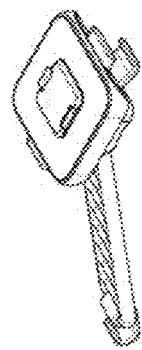
FIGS. 16A-G are schematic representations of a bike mount.
Figure 16F:
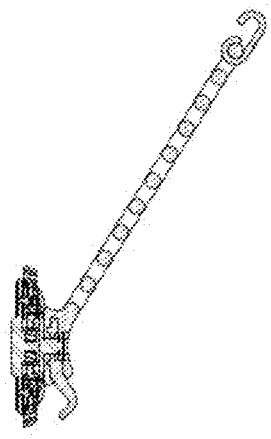
Figure 16D:
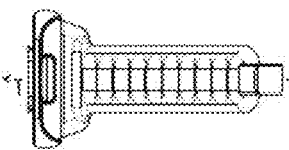
Figure 16A:
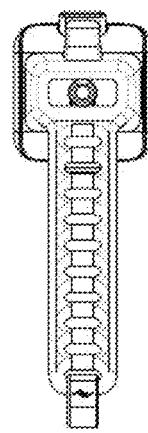
Figure 16C:
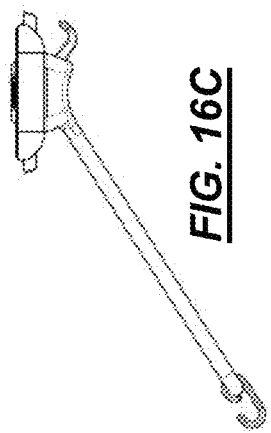
Figure 16E:
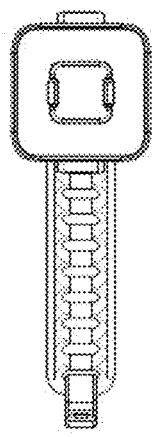
Figure 16B:
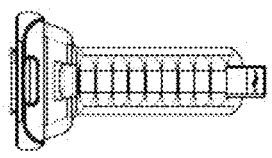
Figure 17G:
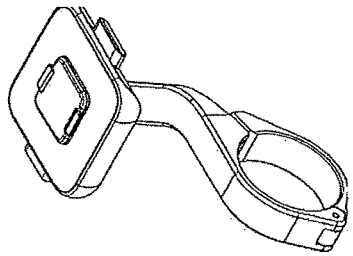
FIGS. 17A-N are schematic representations of a bike mount.
Figure 17F:
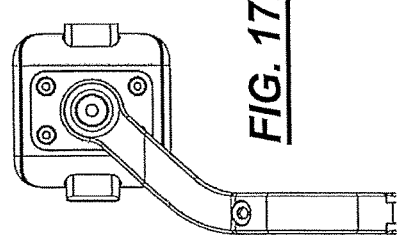
Figure 17D:
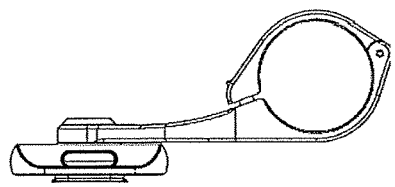
Figure 17A:
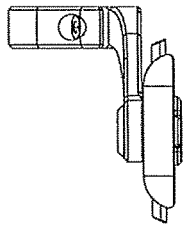
Figure 17C:
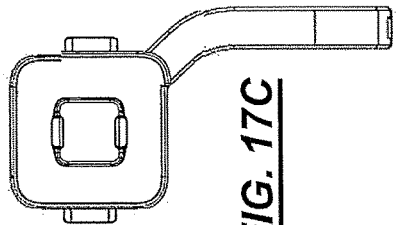
Figure 17E:
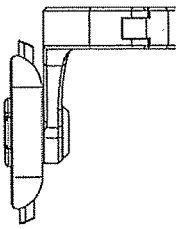
Figure 17B:
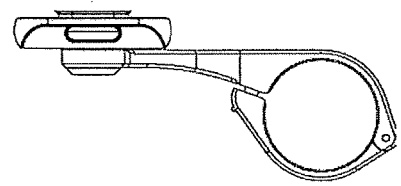
Figure 18A:
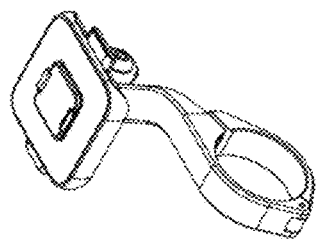
FIGS. 18A-N are schematic representations of a bike mount.
Figures 18F, 18G:
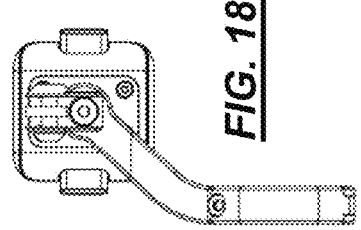
Figure 18D:
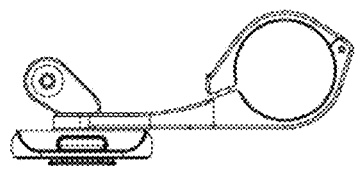
Figure 18A:
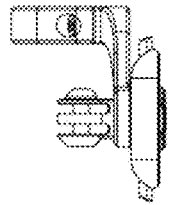
Figure 18C:
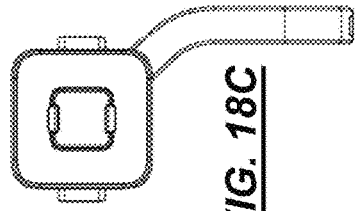
Figure 18E:
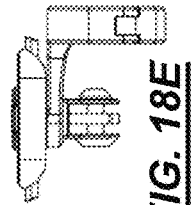
Figure 18B:
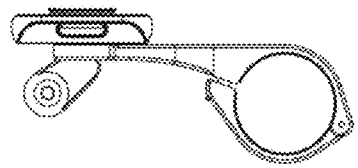
Figure 18N:
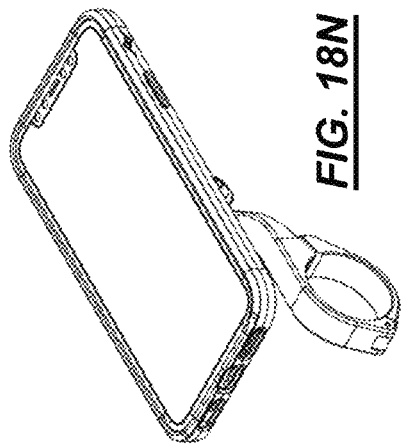
Figure 18M:
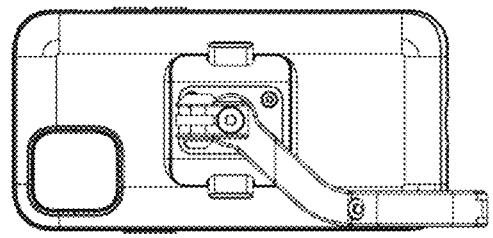
Figure 18K:
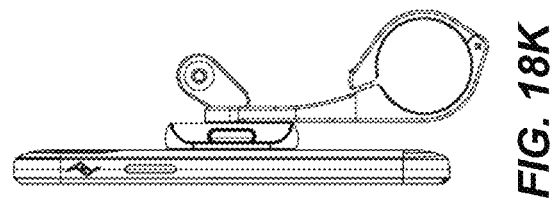
Figure 18H:
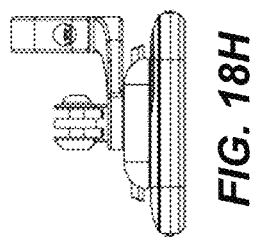
Figure 18J:
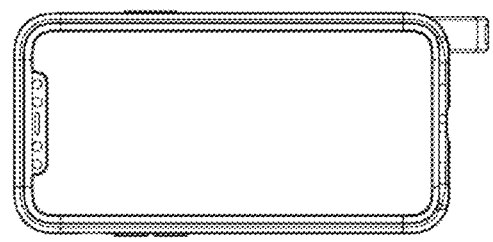
Figure 18L:
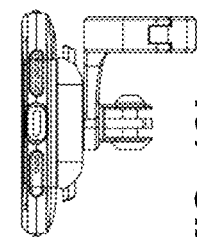
Figure 18I:
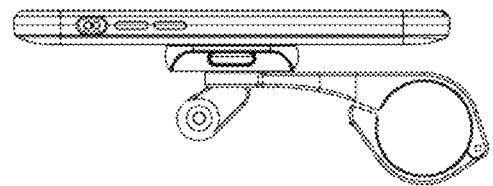
Figure 19S:
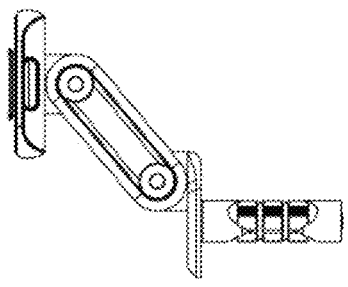
FIGS. 19A-S are schematic representations of a bike mount.
Figure 19R:
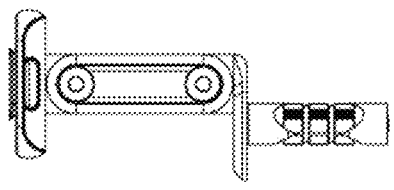
Figure 19Q:
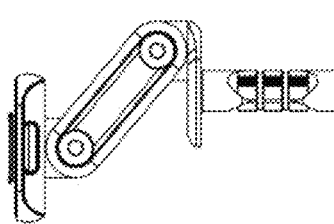
Figure 19P:
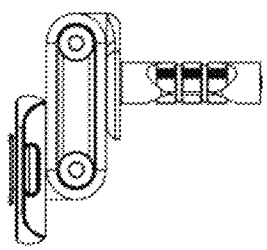
Figure 19O:
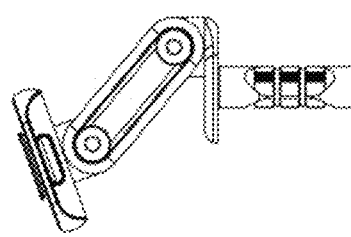
Figure 20G:
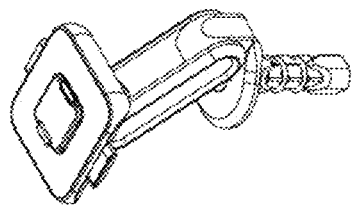
FIGS. 20A-H are schematic representations of a bike mount.
Figure 20H:
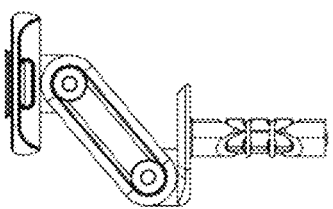
Figure 20D:
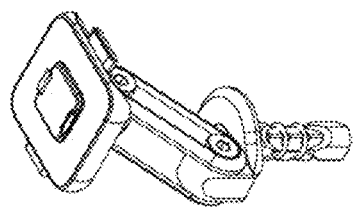
Figure 20F:
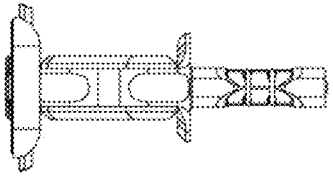
Figure 20A:
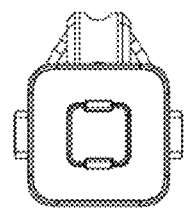
Figure 20C:
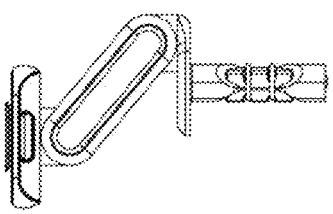
Figure 20E:
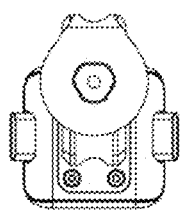
Figure 20B:
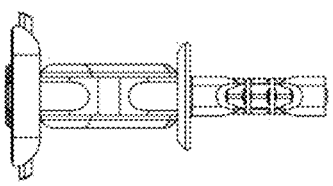
Figure 21H:
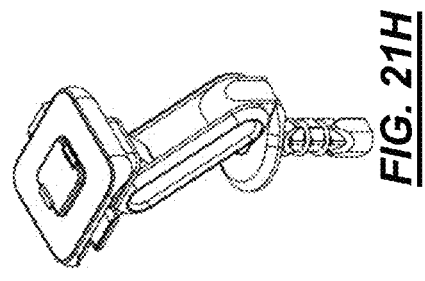
FIGS. 21A-H are schematic representations of a bike mount.
Figure 21F:
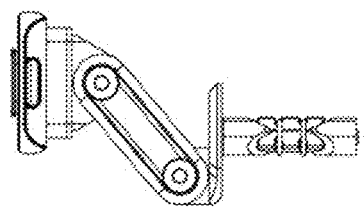
Figure 21G:
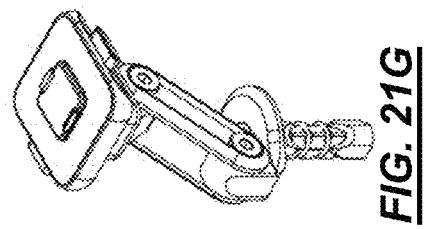
Figure 21D:
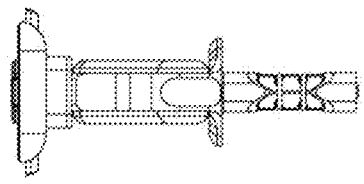
Figure 21A:
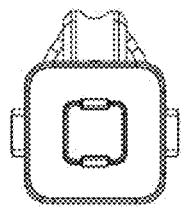
Figure 21C:
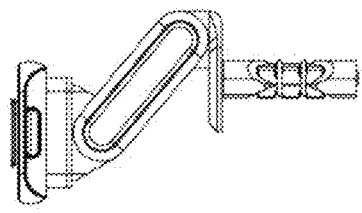
Figure 21E:
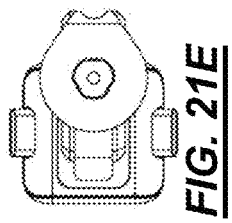
Figure 21B:
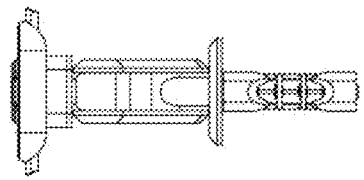
Figure 22H:
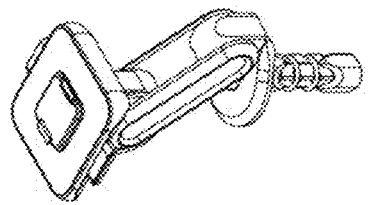
FIGS. 22A-M are schematic representations of a bike mount.
Figure 22F:
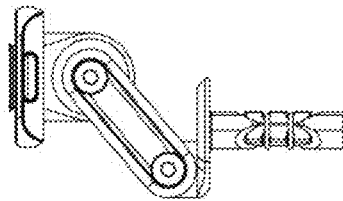
Figure 22G:
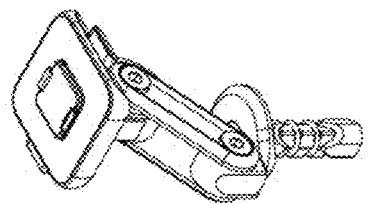
Figure 22D:
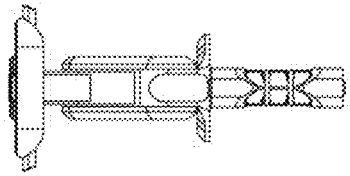
Figure 22A:
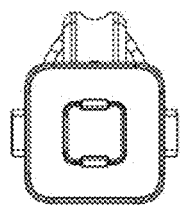
Figure 22C:
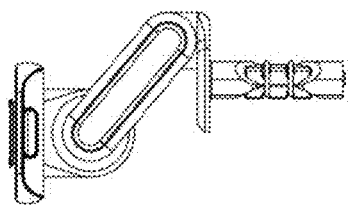
Figure 22E:
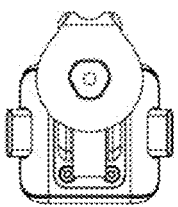
Figure 22B:
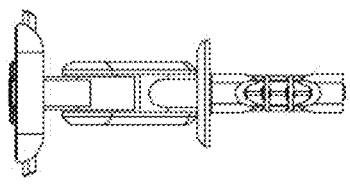
Figure 22M:
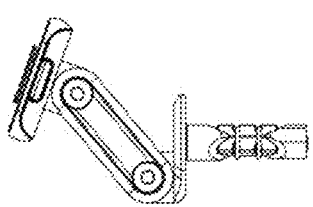
Figure 22L:
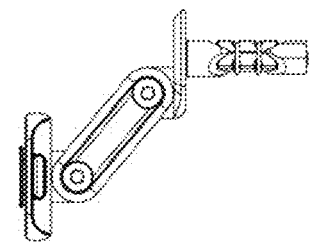
Figure 22K:
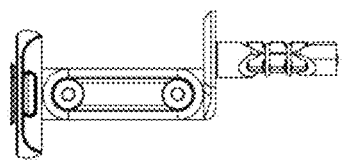
Figure 22J:
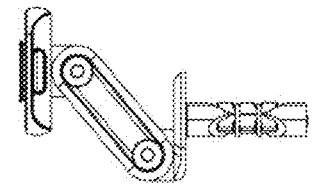
Figure 22I:
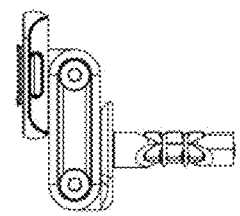
Figure 23N:
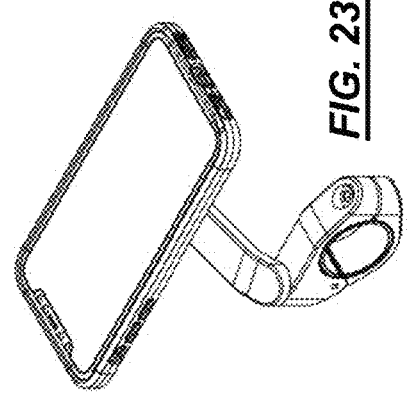
FIGS. 23A-N are schematic representations of a bike mount.
Figure 23M:
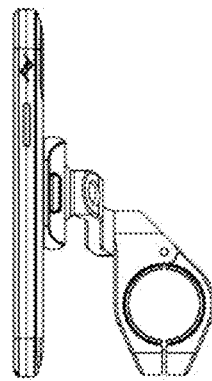
Figure 23K:
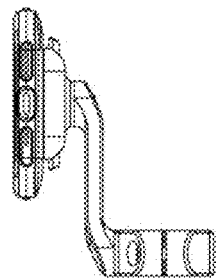
Figure 23H:
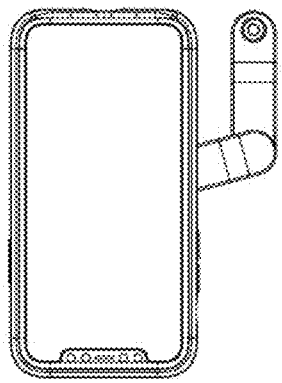
Figure 23J:
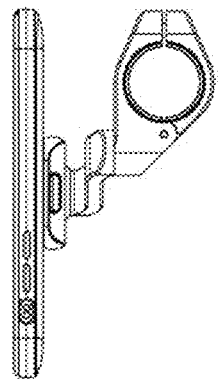
Figure 23L:
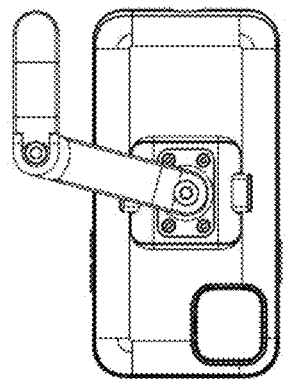
Figure 23I:
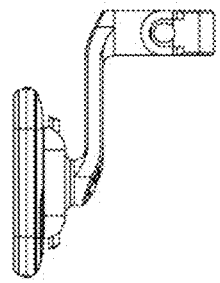

In a second configuration, as shown in FIG. 8B, the mount 120 includes: a polygonal boss 124 extending from the inner face and configured to insert into a rectangular bore 114 of the device case no; a second set of magnetic elements 128 configured to transiently couple to a first set of magnetic elements 118 arranged within the device case no; and a set of locking jaws 126 arranged on the polygonal boss 124 configured to transiently mate with a set of undercut sections 116 within the device case no to constrain the polygonal boss 124 within the rectangular bore 114. In the second configuration, the device case no can couple to the mount 120 via insertion of the polygonal boss 124—including the set of locking jaws 126—into the rectangular bore 114 of the device case no. The second set of magnetic elements 128 of the mount 120 can cooperate with the first set of magnetic elements 118 of the device case no to align the polygonal boss 124 with the rectangular bore 114 and pull the device case no toward the mount 120. Once inserted, the set of locking jaws 126 can latch around the set of undercut sections 116 of the insert 112 to constrain the mount 120 both in rotation and in orthogonal translation relative to the device case 110.

In the second configuration, the polygonal boss 124 is configured to constrain the mount 120 in rotation relative to the device case 110 as in the first configuration. However, the mount 120 in the second configuration can further include the set of locking jaws 126 to constrain the mount 120 in orthogonal translation relative to the device case 110. The first and second set of magnetic elements 128 can cooperate to draw the set of locking jaws 126 through the rectangular bore 114 of the insert 112 which can then latch onto the set of undercut sections 116 within the device case 110, as described above. The first and second sets of magnetic elements can also strengthen retention of the polygonal boss 124 within the rectangular bore 114 by further constraining orthogonal translation of the mount 120 relative to the device case 110.

In one variation, the mount 120 in the second configuration can further include a locking control 130 configured to trigger a subset of locking jaws 126, in the set of locking jaws 126, to decouple from a subset of undercut sections 116, in the set of undercut sections 116 responsive to compression (e.g., by a user). For example, a user may compress a locking control 130 (e.g., release button) on the mount 120 to release a first locking jaw, in the set of locking jaws 126, from a first undercut section, in the set of undercut sections 116, triggering a side of the polygonal boss 124, corresponding to the first locking jaw, to elevate away from the device case 110. The user may then remove the device case 110 from the mount 120 by rotating the device case 110 about a pivot point on the polygonal boss 124 opposite the first locking jaw and lifting the device case 110 away from the mount 120.

In one implementation, the mount 120 in the second configuration includes: a square boss extending from the inner face 123 of the body 122 of the mount 120 configured to insert into the rectangular bore 114 of the device case 110; a set of locking jaws 126 arranged on the polygonal boss 124 and configured to transiently mate with a set of undercut sections 116—defined by the insert 112 of the device case 110—to constrain the polygonal boss 124 within the rectangular bore 114, the set of locking jaws 126 including a first locking jaw and a second locking jaw arranged opposite the other on the polygonal boss 124; and a second set of magnetic elements 128 arranged in a second pattern about the polygonal boss 124 and configured to transiently couple to a first set of magnetic elements 118 of the device case no to align the polygonal boss 124 with the rectangular bore 114 of the insert 112 of the device case no, to transiently retain the mount 120 against a rear face of the device case no, and to drive the set of locking jaws 126 toward the set of undercut sections 116 of the insert 112, the second set of magnetic elements 128 including four magnetic elements evenly spaced about the polygonal boss 124 on the mount 120.

8.2.1 Variation: Bike Mount

In one variation, as shown in FIGS. 8B and 16A-23N, a mount 120 in the second configuration can be configured to couple to a bike (e.g., a bicycle, a motorcycle) and thus mount a mobile device to the bike. This mount 120 (or "bike mount 120") can include the polygonal boss 124 extending from the body 122 of the bike mount 120, the second set of magnetic elements 128 configured to couple to the first set of magnetic elements 118 in a device case no, and a set of locking jaws 126 configured to constrain the polygonal boss 124 within a rectangular bore 114 of the insert 112. Because the mount 120 and the device case 110 may experience a significant amount of force while the bike is in motion, the magnetic forces between magnetic elements in the mount 120 and device case no may not be sufficient to retain the bike mount 120 against the rear face of the device case no. Therefore, the bike mount 120 includes the set of locking jaws 126 to mechanically constrain the polygonal boss 124 within the rectangular bore 114 of the insert 112 of the device case no.

For example, a user may couple a device case no—housing her mobile phone—to a bike mount 120 attached to a handlebar on her bicycle, by aligning the device case no with the mount 120 and gently pushing until the set of locking jaws 126 couple to the undercut sections 116 of the insert 112 of the device case no. As the user pushes down on the device case no, the magnetic elements in both the device case no and the mount 120 can cooperate to guide the polygonal boss 124 of the mount 120 including the set of locking jaws 126 into the rectangular bore 114 of the insert 112 of the device case no. The set of locking jaws 126 can slide along a set of undercut sections 116 defined by the insert 112 of the device case no and eventually drop past the apex of these undercut sections 116 to seat under the rear face of the device case no and positioned against the set of undercut sections 116. Once the device case no is mechanically locked into the mount 120 via the set of locking jaws 126, the user may ride her bicycle and view her mobile phone fixed relative to the handlebar, such as to track her ride via GPS.

In one implementation, as shown in FIG. 8B, a bike mount 120 can include an emplacement mechanism 140 defining a clasp configured to attach to a surface (e.g., a handlebar, a stem, a top tube) of a bike; and an oversized jaw spring defining an increased spring stiffness configured to expand the locking jaws with greater force in order to retain the device case 110 against the mount 120 with greater force to compensate for road vibration during use.

Additionally and/or alternatively, the mount 120 in the second configuration can be configured to couple to surfaces of other vehicles. For example, the mount 120 in the second configuration can be configured to couple to a surface of a stroller. In another example, the mount 120 in the second configuration can be configured to couple to a surface of a golf cart.

8.2.2 Variation: Tablet

In one variation, a mount 120 in the second configuration can be configured to couple to a device case no configured to house a tablet. This mount 120 (or "tablet mount 120") can include the polygonal boss 124 extending from the body 122 of the bicycle mount 120, the second set of magnetic elements 128 configured to couple to the first set of magnetic elements 118 in a device case no, and a set of locking jaws 126 configured to constrain the polygonal boss 124 within a rectangular bore 114 of the insert 112. Because the tablet is larger and/or heavier than a smartphone, magnetic forces between the first of magnetic elements 118 in the device case no and the second set of magnetic elements 128 in the tablet mount 120 may not be sufficient to retain the mount 120 against the rear face of the device case no against the weight of the tablet. Therefore, the tablet mount 120 can include a set of locking jaws 126 to mechanically constrain the tablet mount 120 relative to the device case no.

A tablet mount 120 can include a release extension extending to proximal an edge of a tablet and configured to engage the locking control 130, thereby enabling a user to release the tablet from the tablet mount 120 with a single hand and in a single motion when reaching for the tablet and without reaching behind the tablet.

8.2.3 Variation: Textile Mount

In one variation, a mount 120 in the second configuration can be configured to couple to a textile panel, such as an article of clothing worn by a user (e.g., an armband). This mount 120 (or "textile mount 120") can include the polygonal boss 124 extending from the body 122 of the textile mount 120, the second set of magnetic elements 128 configured to couple to the first set of magnetic elements 118 in a device case 110, and a set of locking jaws 126 configured to constrain the polygonal boss 124 within a rectangular bore 114 of the insert 112.

In one example, the textile mount 120 can be configured to be worn as an armband. Thus, as the user exercises while wearing the armband, the set of jaws and magnetic elements can cooperate to constrain the user's mobile device to the armband. In this example textile mount 120 can include an emplacement mechanism 140 defining a cloth band for securing to the user's arm. The cloth band can be formed of an elastic material to enable the armband to secure tightly to the user's arm without causing discomfort to the user.

8.3 Third Configuration: Polygonal Boss+Magnets+Inductive Charging

In a third configuration, the mount 120 includes a second set of magnetic elements 128 configured to transiently couple to a first set of magnetic elements 118 arranged within the device case 110; and a charging element 150 housed within the body 122 of the mount 120, inset from the second set of magnetic elements 128, and configured to inductively charge a mobile device installed within the device case 110. The mount 120 in the third configuration can also include a polygonal boss 124 configured to insert into the rectangular bore 114 of the insert 112 of the device case 110. The second set of magnetic elements 128 of the mount 120 can cooperate with the first set of magnetic elements 118 of the device case 110 to: align the charging element 150 within the body 122 of the mount 120 with a charge receiving element in the mobile device installed within the device case 110; and to transiently retain the mount 120 against a rear face of the device case 110. When the device case 110 is coupled to the mount 120, in the third configuration, the first and second set of magnetic elements 128 in the device case 110 and the mount 120 can couple to retain the mount 120 against the rear face of the device case 110 and align the charging element 150 (e.g., an induction coil) to the charge receiving element in the mobile device housed within the device case 110 in order to charge a battery of the mobile device.

In the third configuration, the charging element 150 in the mount 120 can be configured to sit within a threshold distance of the charge receiving element in a mobile device housed within the device case 110 in order to transfer a maximum charge to the charge receiving element. Therefore, in the third configuration, the mount 120 can be assembled without the polygonal boss 124 such that the charging element 150 can supply charge to the charge receiving element without interference from the polygonal boss 124.

Figure 7:
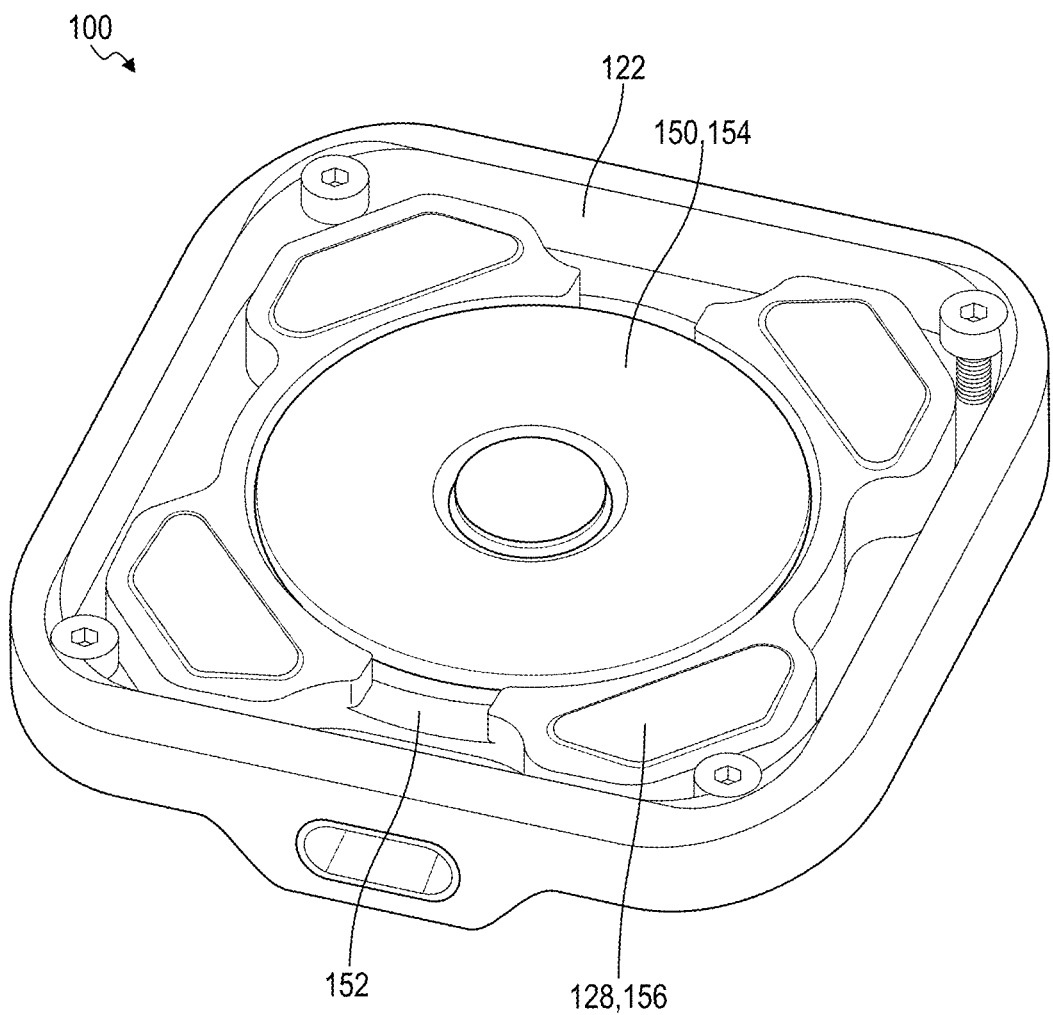
FIG. 7 is a schematic representation of the mounting system.

In one implementation, as shown in FIG. 7, the mount 120 in the third configuration includes: a ferrite insert defining a central cavity 154 and a set of receptacles 156 arranged in a first pattern about the central cavity 154, the first set of magnetic elements 118 in the device case 110 also arranged in the first pattern; a second set of magnetic elements 128 arranged within the set of receptacles 156 within the ferrite insert and an induction coil arranged within the central cavity 154, inset from the second set of magnetic elements 128, and configured to inductively charge a device installed within the device case 110. The ferrite insert can be configured to shield the inductive coil from the second set of magnetic elements 128 and focus a magnetic field output by the inductive coil toward a charge receiving element in the device. Further, the induction coil can be coupled to a printed circuit board (or "PCB"). The ferrite insert—including the induction coil and the second set of magnetic elements 128—and the PCB can be housed within the body 122 of the mount 120. In this implementation, the body 122 can: include a chassis formed of a non-magnetic material and configured to house the ferrite insert and the PCB; and a landing pad formed of a polymer material (e.g., polyurethane), arranged on the inner face 123 of the body 122, and configured to couple to a rear face of the device case 110.

For example, a user may place her smartphone housed within a device case 110 on a thermoplastic polyurethane (or "TPU") landing pad of a mount 120 such that a rear face of the device case no contacts the TPU landing pad. The user may shift her smartphone about the TPU landing pad until the first set of magnetic elements 118 in the device case no align with the second set of magnetic elements 128 in the mount 120, thus securing the smartphone on the mount 120 and providing feedback to the user that the smartphone is properly secured to the mount 120 and in the correct position. While the smartphone housed within the device case 110 is coupled to the mount 120, the induction coil in the mount 120 can cooperate with a charge receiving element in the mobile device and facing the induction coil in order to charge a battery of the mobile device. The user may easily remove her mobile device from the mount 120 by applying a force to her mobile device greater than the magnetic force between the first and second set of magnetic elements 128.

Alternatively, the mount 120 in the third configuration can additionally include the polygonal boss 124 to strengthen coupling between the mount 120 and the device case no by constraining rotation of the mount 120 relative to the device case no. For example, the ferrite insert—including the charging element 150 and the second set of magnetic elements 128—can be arranged adjacent the inner face 123 of the body 122 of the mount 120, such that the charging element 150 falls within a threshold distance (e.g., less than five millimeters) of a charge receiving element in a mobile device housed within the device case no when the device case no is coupled to the mount 120.

(In this configuration, the mount 120 can exclude the second set of magnetic elements to enable a larger charging element to fit within the mount 120. Alternatively, the mount 120 can include the second set of magnetic elements for primary retention of the mount 120 to the device case no and exclude the polygonal boss. Alternatively, the mount 120 can include both the polygonal boss and the second set of magnets for mechanical and magnetic retention of the mount 120 to the device case 110.)

8.3.1 Variation: Desktop Mount

Figure 24N:
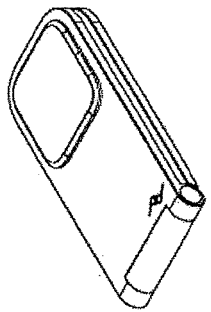
FIGS. 24A-N are schematic representations of a desktop mount.
Figure 24M:
Figure 24K:
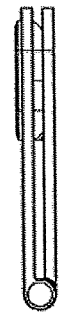
Figure 24H:
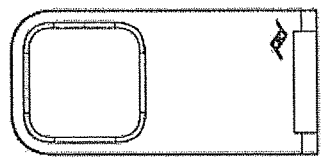
Figure 24J:
Figure 24L:
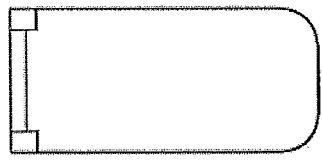
Figure 24I:
Figure 25A:
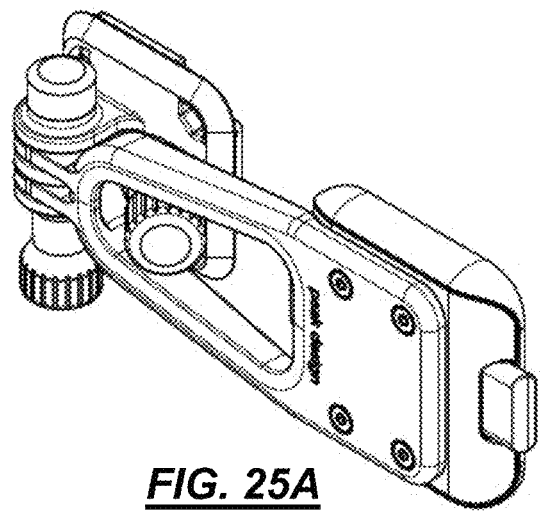
FIGS. 25A-G are schematic representations of a tripod mount.
Figure 25B:
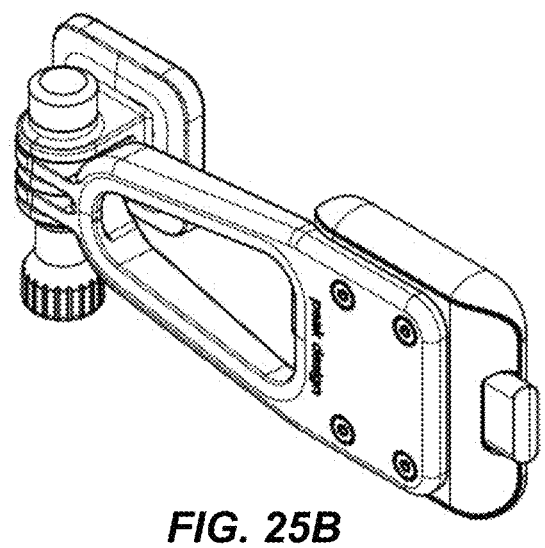
Figure 25F:
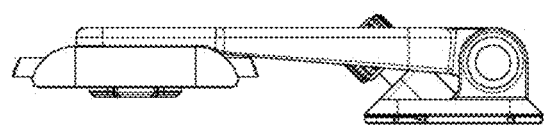
Figure 25C:
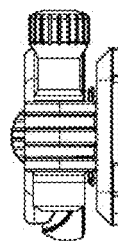
Figure 25E:
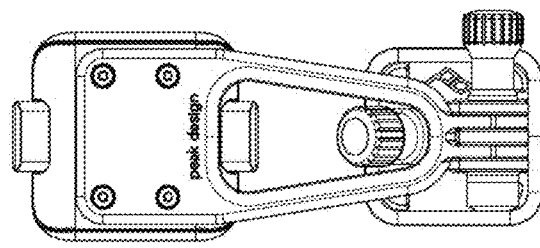
Figure 25G:
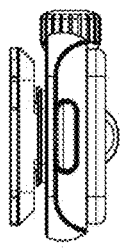
Figure 25D:
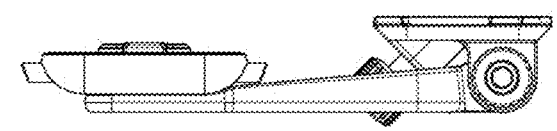
Figure 26A:
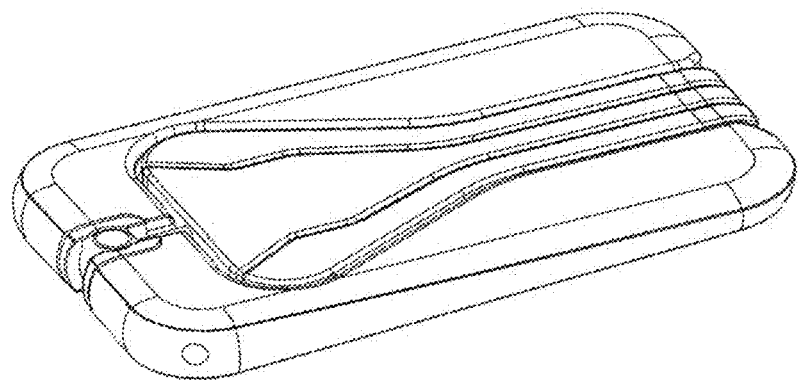
FIGS. 26A-M are schematic representations of a tripod mount.
Figure 26B:
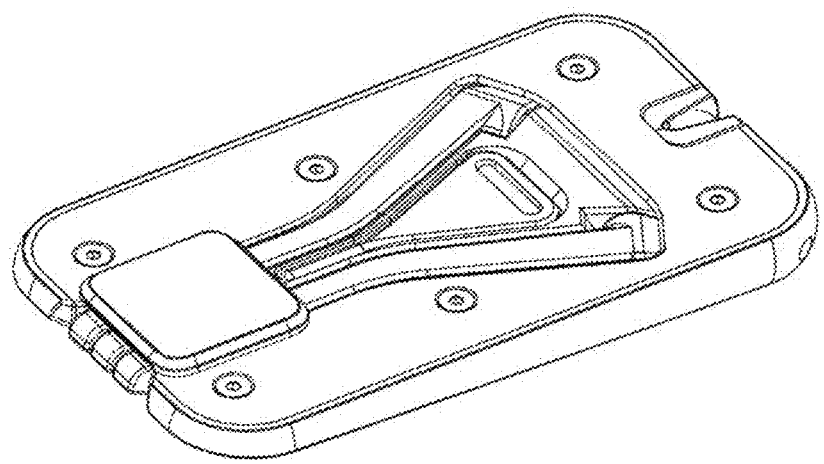
Figure 26F:
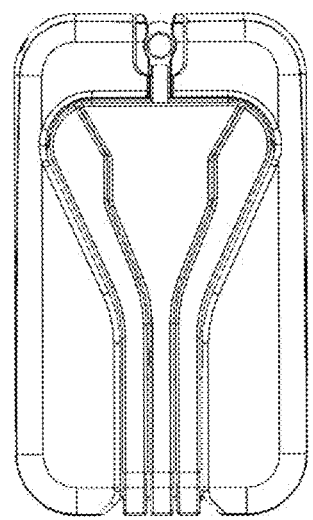
Figure 26D:
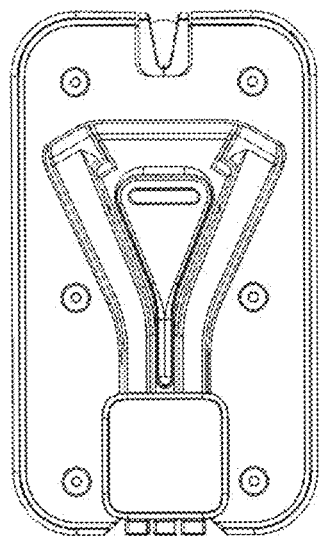
Figure 26E:
Figure 26C:
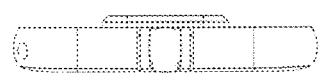
Figure 26G:
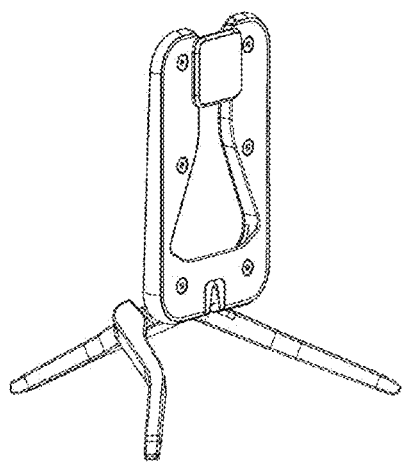
Figure 26H:
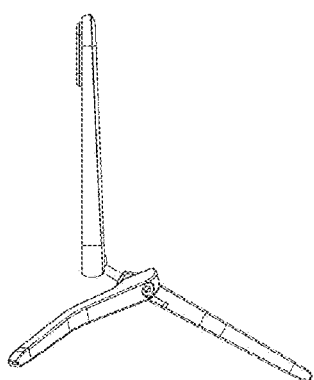
Figure 26I:
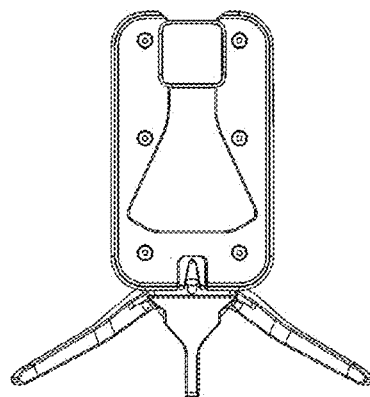
Figure 26J:
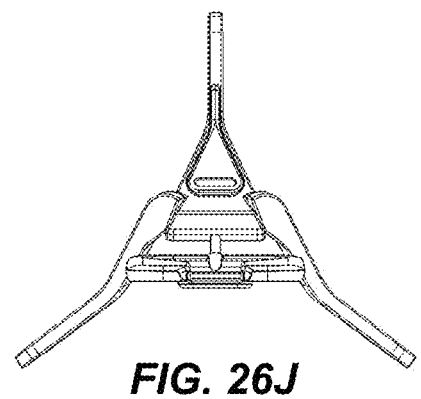
Figure 26K:
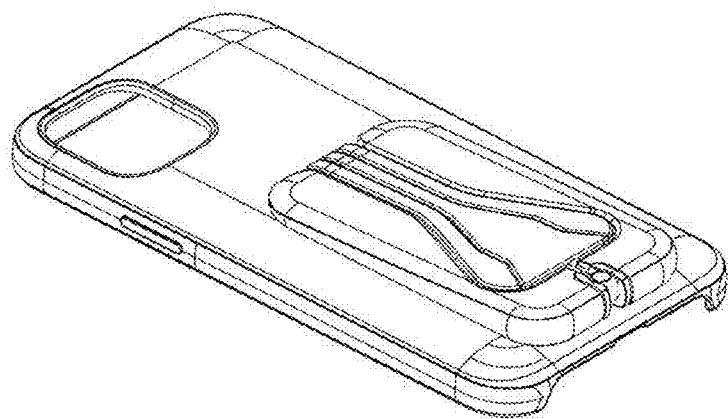
Figure 26L:
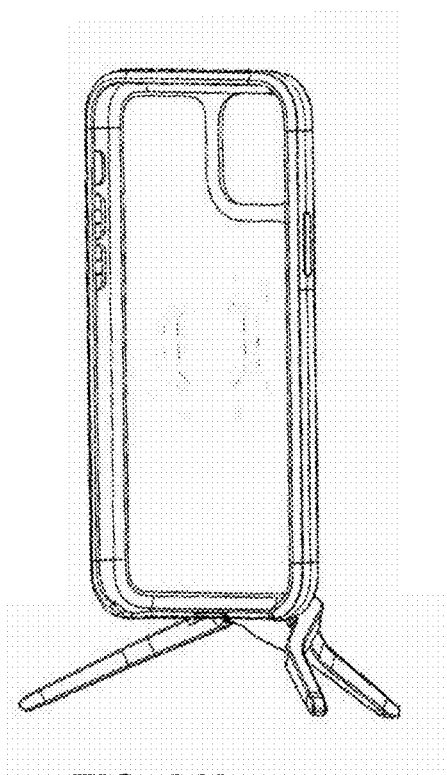
Figure 26M:
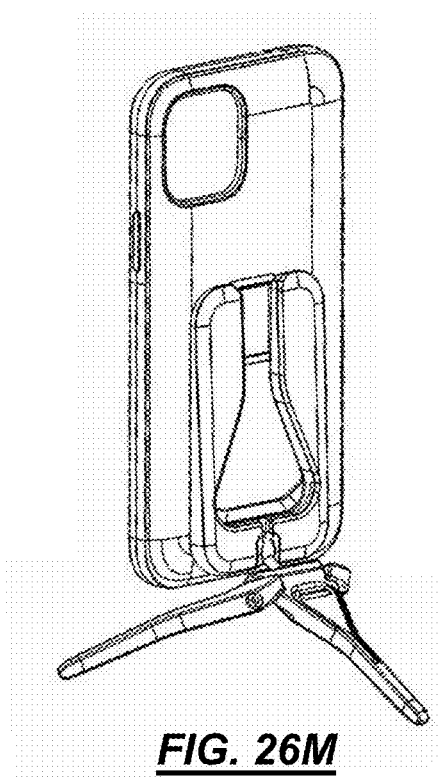
Figure 28A:
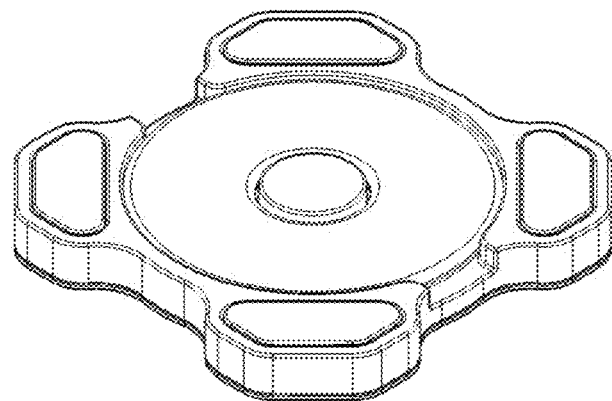
FIGS. 28A-F are schematic representations of a charging element.
Figure 28B:
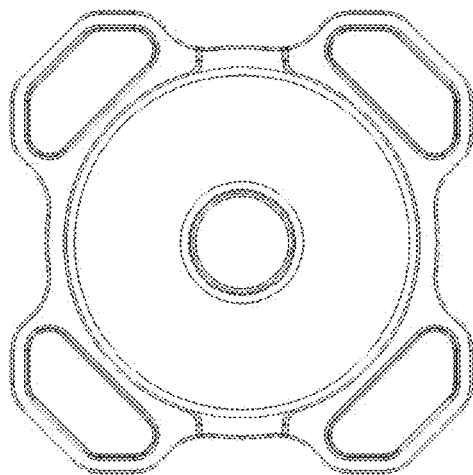
Figure 28C:
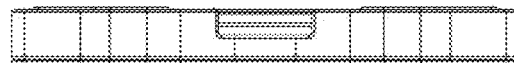
Figure 28D:
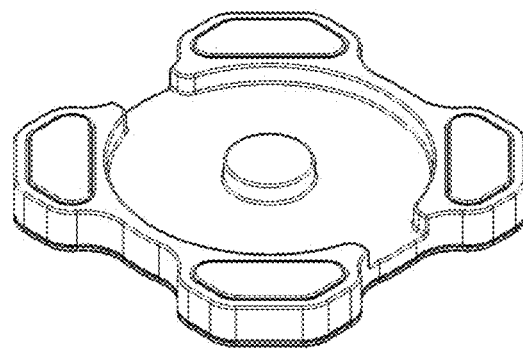
Figure 28E:
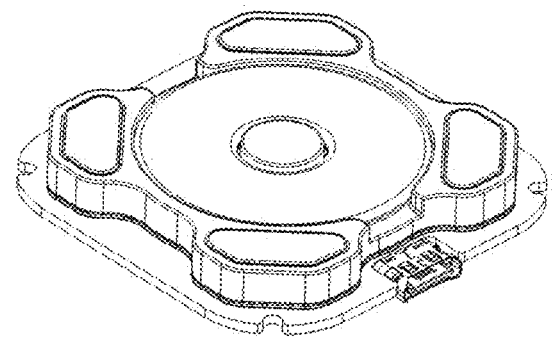
Figure 28F:
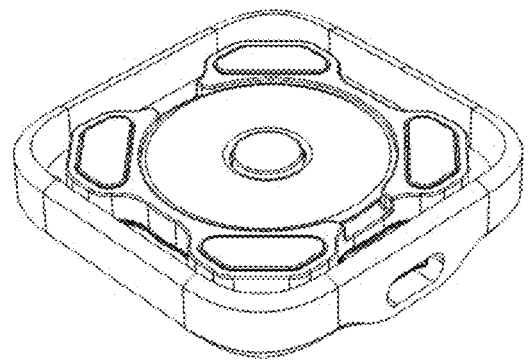

In one variation, as shown in FIGS. 24A-N, a mount 120 can be configured to couple the device case no to a flat surface (e.g., a desktop surface). This mount 120 (or "desktop mount 120") can also be configured to charge a mobile device housed within the device case no. The desktop mount 120 can be configured to include the second set of magnetic elements 128 configured to couple to the first set of magnetic elements 118 in the device case no and a charging element 150 inset from the second set of magnetic elements 128. In one implementation, the wireless charging mount 120 can lock the mobile device using only the magnetic force (e.g., without a set of locking jaws) to enable a user to remove the device more quickly from the desktop mount 120.

A desktop mount 120 can include an emplacement mechanism 140 defining a base configured to rest on a surface (e.g., a table or desk). For example, the desktop mount 120 can include a base configured to rest flat on a desktop surface and coupled on one end to the body of the mount 120 via a pin extending the width of the base, such that the body—and a mobile device housed within the device case no coupled to the body—can rotate about the pin while the base rests flat and motionless on the desktop surface.

8.3.2 Variation: Wall Mount

In one variation, as shown in FIGS. 14A-G, a mount 120 can be configured to couple the device case no to a wall. The mount 120 (or "wall mount 120") can be assembled in the third configuration including the second set of magnetic elements 128 configured to couple to the first set of magnetic elements 118 in the device case no and a charging element 150 inset from the second set of magnetic elements 128 and configured to transiently inductively charge a mobile device installed within the device case no. Alternatively, the wall mount 120 can be assembled in the first configuration without the charging element 150. Because the wall mount 120 is configured to couple to a surface of a wall, rotation of the wall mount 120 about the device case 110 (or visa versa) is unlikely. Therefore, the wall mount 120—in some instances—may not include a polygonal boss 124. For example, the wall mount 120 can be secured to a wall in the user's garage, such that the user may secure her mobile phone (or tablet) while playing a car-maintenance tutorial and thus keep her hands free while accessing tools.

A wall mount 120 can include an emplacement mechanism 140 defining an anchor bore for receiving a wall anchor (e.g., a screw, fastener, adhesive, double stick tape, etc.). In one example, the wall mount 120 includes a backing coupled to the body 122 of the wall mount 120 and including an adhesive coating applied to an outer face of the backing— opposite the body and configured to affix the mount 120 to a surface of a wall.

In one variation, the wall mount 120 also includes a polygonal boss 124 configured to insert into the rectangular bore 114 of the device case no, to constrain rotation of the wall mount 120 relative to the device case no and further strengthen the connection between the wall mount 120 and the device case no.

9. Variation: Adapter

In one variation, as shown in FIGS. 27A-H, the mounting system 100 includes the insert 112 exclusive of the device case no (or "an adapter") and configured to couple—such as with an adhesive, tape, hook-and-loop strip, or suction—to a surface of a mobile device, a case, or other object. For example, the insert 112 can be affixed directly to a back surface of a user's mobile device or to a back surface of the user's existing mobile device case no to enable the mobile device or existing mobile device case 110 to transiently install on the mount 120. In this variation, the insert 112 can therefore adapt any device case no, mobile device, or other object to interface with the mount 120. Thus, the insert 112 absent the device case no forms an adapter.

As a person skilled in the art will recognize from the previous detailed description and from the figures and claims, modifications and changes can be made to the embodiments of the invention without departing from the scope of this invention as defined in the following claims.

We claim:

1. A mounting system comprising:
   a device case comprising:
      a back side
      an insert in the back side:
         comprising a bore; and
         defining at least one undercut section about the bore configured to transiently mate with a boss of a mobile device mount;
      a first set of magnetic or ferromagnetic elements in the back side of the device case arranged in a first pattern about the bore; and
   a mobile device mount comprising:
      a body;
      a boss:
         extending from an inner face of the body; and
         configured to insert into the bore of the device case;
      a second set of magnetic or ferromagnetic elements arranged in a second pattern about the boss; and configured to transiently couple to the first set of magnetic or ferromagnetic elements in the back side of the device case to align the boss with the bore of the insert of the device case, to transiently retain the mount against a rear face of the device case; and
      a guard or pad layer configured to abut the inner face of the body of the mobile device mount with the back side of the device case to stabilize the boss within the insert.

2. The mounting system of claim 1:
   wherein the device case comprises a polymer housing configured to accept and retain a mobile device; and
   wherein the insert comprises a ceramic structure.

3. The mounting system of claim 1, wherein the second set of magnetic or ferromagnetic elements arranged in the second pattern about the boss of the mobile device mount are configured to align with the first set of magnetic or ferromagnetic elements arranged in the first pattern about the one or more bores of the insert of the device case, the second pattern reflecting the first pattern across a plane parallel to the device case.

4. The mounting system of claim 1:
   wherein the mobile device mount further comprises a fastener coupled to the body and configured to affix the mobile device mount to a surface of a vehicle; and
   wherein the fastener comprises a clasp configured to clutch a surface of a bike.

5. The mounting system of claim 1 further comprising:
   a charging element:
      housed within the body of the mobile device mount.

6. The mounting system of claim 5:
   wherein the mobile device mount further comprises an insulator insert configured to shield the charging element from the second set of magnetic elements in the mobile device mount.

7. The mounting system of claim 6:
   wherein the insulator insert defines a central cavity and a set of trapezoidal receptacles arranged in a first pattern about the central cavity;

wherein the charging element comprises an induction coil arranged within the central cavity; and wherein the second set of magnetic or ferromagnetic elements define trapezoidal sections and are arranged in the set of trapezoidal receptacles within the insulator insert.

8. The mounting system of claim 5, wherein the second set of magnetic or ferromagnetic elements arranged in the second pattern are configured to transiently align a center of each magnetic or ferromagnetic element in the second set of magnetic or ferromagnetic elements within a threshold distance of a corresponding magnetic or ferromagnetic element in the first set of magnetic or ferromagnetic elements arranged in the first pattern to transiently retain the mobile device mount against a rear face of the device case.

9. The mounting system of claim 5:

wherein the device case comprises a polymer housing configured to accept and retain a mobile device; and wherein the insert comprises a fiberglass structure.

10. The mounting system of claim 5:

wherein the device case comprises a polymer housing configured to accept and retain a mobile device of the user; and wherein the charging element is configured to inductively charge the mobile device of the user transiently retained within the device case.

\* \* \* \* \*